(12) United States Patent
Thurston, III et al.

(10) Patent No.: US 11,488,348 B1
(45) Date of Patent: Nov. 1, 2022

(54) COMPUTING VIRTUAL SCREEN IMAGERY BASED ON A STAGE ENVIRONMENT, CAMERA POSITION, AND/OR CAMERA SETTINGS

(71) Applicant: Weta Digital Limited, Wellington (NZ)

(72) Inventors: Kimball D. Thurston, III, Wellington (NZ); Joseph W. Marks, Boston, MA (US); Luca Fascione, Wellington (NZ); Millicent Maier, Wellington (NZ); Kenneth Gimpelson, Wellington (NZ); Dejan Momcilovic, Wellington (NZ); Keith F. Miller, Wellington (NZ); Peter M. Hillman, Wellington (NZ)

(73) Assignee: Unity Technologies SF, San Francisco, CA (US)

( * ) Notice: Subject to any disclaimer, the term of this patent is extended or adjusted under 35 U.S.C. 154(b) by 0 days.

(21) Appl. No.: 17/547,173

(22) Filed: Dec. 9, 2021

Related U.S. Application Data

(60) Provisional application No. 63/287,920, filed on Dec. 9, 2021.

(51) Int. Cl.
*G06T 15/20* (2011.01)
*G06T 15/50* (2011.01)
(Continued)

(52) U.S. Cl.
CPC ............ *G06T 15/20* (2013.01); *G06T 5/002* (2013.01); *G06T 7/13* (2017.01); *G06T 7/536* (2017.01);
(Continued)

(58) Field of Classification Search
None
See application file for complete search history.

(56) References Cited

U.S. PATENT DOCUMENTS 10,552,947 B2 * 2/2020 Liang ................. G06F 3/04842
10,992,845 B1 * 4/2021 Seely ................... H04N 5/2226
(Continued)

OTHER PUBLICATIONS

Hayes et al., U.S. Appl. No. 17/378,503, "Smoothly Changing a Focus of a Camera Between Multiple Target Objects", filed Jul. 16, 2021.

(Continued)

*Primary Examiner* — James A Thompson
(74) *Attorney, Agent, or Firm* — Philip H. Albert; William T. Hoyer McCarthy; Haynes and Boone LLP

(57) ABSTRACT

Methods and systems are presented for generating a virtual scene rendering usable in a captured scene based on a camera position of a camera in a stage environment, a mapping of a plurality of subregions of a virtual scene display in the stage environment to corresponding positions in the stage environment, and details of a virtual scene element. The details might include a subregion of the plurality of subregions for the virtual scene element where on the virtual scene display the given virtual scene element would, at least in part, appear, and stage subregion depth values. A blur factor for a corresponding subregion might be determined based at least in part on the stage subregion depth value and the virtual subregion depth value. Rendering the virtual scene might take into account the blur factor for the given virtual scene element.

15 Claims, 13 Drawing Sheets

(51) Int. Cl.
  *G06T 5/00* (2006.01)
  *G06T 7/13* (2017.01)
  *G06T 7/536* (2017.01)
  *G06T 7/90* (2017.01)
  *G06T 7/73* (2017.01)
(52) U.S. Cl.
  CPC .................. *G06T 7/75* (2017.01); *G06T 7/90* (2017.01); *G06T 15/503* (2013.01)

(56) References Cited

U.S. PATENT DOCUMENTS

| | | | |
|---|---|---|---|
| 2005/0187015 A1* | 8/2005 | Suzuki | A63F 13/5255 463/32 |
| 2017/0206700 A1* | 7/2017 | Munkberg | G06T 15/005 |
| 2017/0374341 A1* | 12/2017 | Michail | G06T 19/006 |
| 2018/0276824 A1* | 9/2018 | Haraden | G02B 27/0172 |
| 2019/0122418 A1* | 4/2019 | Peng | G06T 1/20 |
| 2019/0347771 A1* | 11/2019 | Suszek | G06T 3/40 |
| 2020/0410766 A1* | 12/2020 | Swaminathan | G06T 17/00 |
| 2021/0072822 A1* | 3/2021 | Smith | G06F 3/012 |
| 2022/0189108 A1* | 6/2022 | Shandilya | G06K 9/6217 |

OTHER PUBLICATIONS

Hillman, Peter, U.S. Appl. No. 17/086,032, "Method for Emulating Defocus of Sharp Rendered Images", filed Oct. 30, 2020.

* cited by examiner

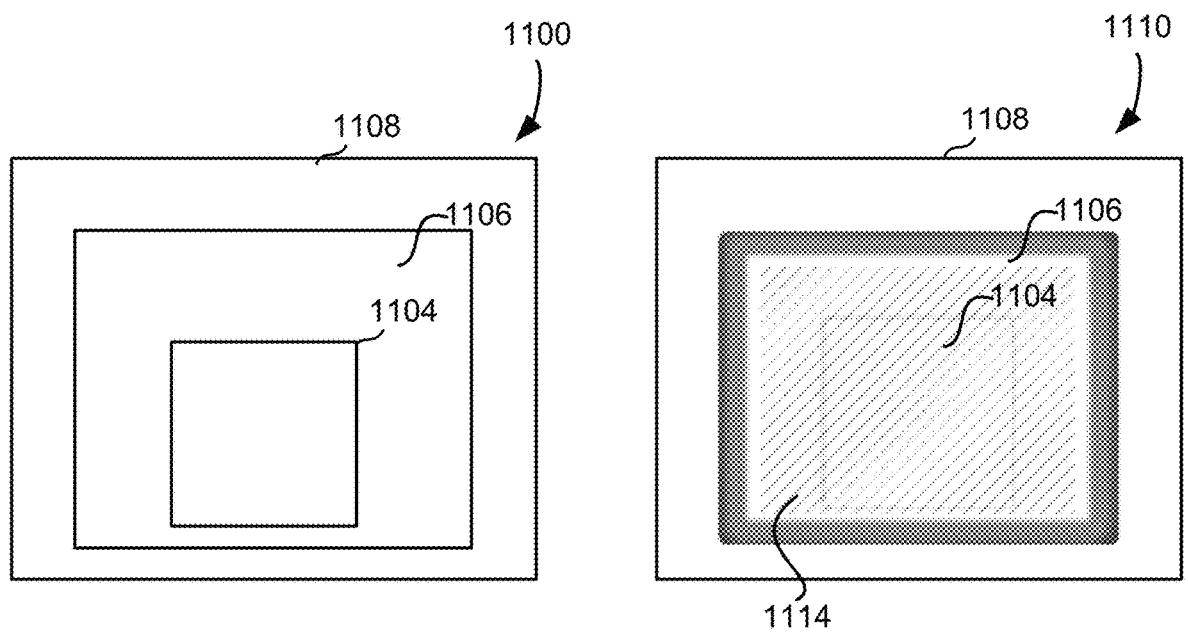
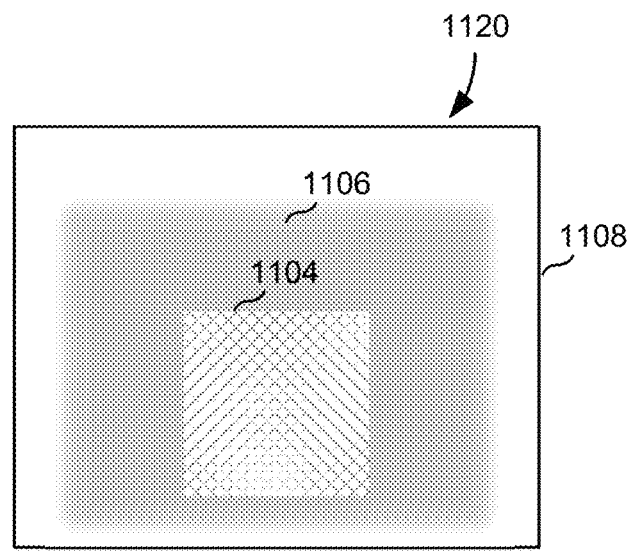
FIG. 11

COMPUTING VIRTUAL SCREEN IMAGERY BASED ON A STAGE ENVIRONMENT, CAMERA POSITION, AND/OR CAMERA SETTINGS

CROSS-REFERENCE TO RELATED APPLICATIONS

This application claims the priority benefit under 35 U.S.C. § 119(e) of U.S. Provisional Patent Application No. 63/287,920 filed Dec. 9, 2021. The entire disclosure of the application recited above is hereby incorporated by reference, as if set forth in full in this document, for all purposes.

FIELD

The present disclosure generally relates to methods and apparatus for computerized image processing and more particularly to processing a computer-generated image related to emulating focus/defocus effects for virtual objects displayed on a display wall.

BACKGROUND

In computer-generated image generation and animation, of imagery comprising images and/or video sequences, there might be a desire to incorporate a video wall while capturing a live action scene of an actor. In a detailed live action scene that incorporates background animated elements, it could be difficult to properly coordinate a live actor with those background elements. Furthermore, if it is desirable to project lights, colors, or other real-world effects on a live actor, it may be tedious to ensure that those effects are properly aligned between the live actor and the animated background imagery that is later added to a scene. Animated objects that may be placed in a background scene and/or with a live action scene can comprise many individual objects, which may have their own lighting effects, colors, and/or interactions with live actors. For example, a scene involving an explosion or other intense light may have features that cause colors to be projected onto live actors. Background scenes may also involve stage elements and/or creatures that interact with live actors, such as by acting as an environment and/or engaging with live actors. As such, it might be useful to deploy an image generation device to display imagery in a stage environment whereby a camera capturing the stage scene captures actions and presence of the live actor, stage props, etc., as well as capturing what is displayed by the image generation device with what is displayed by the image generation device giving off light that might impinge on the live actor, stage props, etc.

An image generation device might be placed relative to a camera such that the camera captures a scene that includes the image generation device while the image generation device is displaying imagery or captures a scene that is in part illuminated by light emitted by the image generation device. The image generation device may occupy part of a background of a stage scene or might encompass all of the background of the stage scene. The image generation device may be planar and may might be referred to as a video wall.

Physical stage sets can be expensive and time-consuming to produce, which may be prohibitive for short scenes or scenes in a project with limited schedule or budget. Conversely, painted backdrops or matte paintings may not provide desired realism. It is commonplace in video production to film actors and foreground objects on a greenscreen stage, to which digital backgrounds, characters, and special effects can be added later. However, actors may have difficulty reacting to objects, events, or characters they cannot see. Furthermore, the lighting effects produced by explosions, moving objects, and other changes in the digital video may be difficult to reproduce on the physical stage, thus impairing realism. For this reason, some video production now employs a display wall (also known as a video wall, LED wall, etc.) at the rear of the live-action stage, which is capable of displaying rendered digital backgrounds, characters, effects, and lighting in real time.

For simple scenes and/or backgrounds, modeling or drawing individual background objects and/or scenes might not be difficult. However, as viewers have come to expect more complex visuals, there is a need for a procedural processing, rendering, and adjusting backgrounds to appear more realistic. Further, stereoscopic imaging may be used to capture scenes as they would be viewed from different angles, and therefore add depth and 3D elements to the captured images and video. When 2D elements are added to a display wall or other 2D object, the display wall may not appear realistic with 3D live actors when a live scene is stereoscopically captured.

Furthermore, when a virtual object is displayed in the display wall, it is necessarily located "behind" the display wall in a virtual space, and thus has a "depth" relative to a physical camera that is equal to, on a straight line connecting the physical camera with the virtual object, the physical distance or stage environment distance between the camera and the video wall, plus the virtual distance between the video wall and the object. The lens characteristics of the physical camera may dictate that an object at such a depth "should" be out of focus (i.e., would be out of focus if it were a physical object at that physical depth). Moreover, multiple objects at different depth within the scene "should" be defocused to different degrees. However, defocus of objects or scene elements shown on the display wall is currently performed by altering the focal characteristics of a physical lens on the physical camera, and thus all virtual objects and virtual scene elements are defocused to the same degree, based on the distance between the camera and the display wall.

In some implementations, a method and apparatus for emulating a depth of field effect of a physical camera and allowing portions of a scene to be defocused post-rendering, in real time, might be desirable.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method of generating a virtual scene rendering usable in a captured scene. The computer-implemented method includes determining a camera position of a camera, light sensor, image capture device, etc., in a stage environment; determining a display position of a virtual scene display in the stage environment; determining a virtual focus model, based at least on a relative positioning as between the camera position and the display position, where the virtual focus model is represented by a focus model data structure defining how focus should be applied to virtual scene elements in the virtual scene to be presented on the virtual scene display while the camera captures imagery of the stage environment including the virtual scene display; determining a depth value for a given virtual scene element, where the depth value corresponds to a virtual distance in the virtual scene between the given virtual scene element and a virtual camera viewpoint and/or the virtual scene display; determining an adjusted focus, in the virtual scene, of the given virtual scene element based on at least the depth value and the relative positioning; and rendering the virtual scene taking into account the adjusted focus. Other implementations of this aspect include corresponding computer systems, apparatus, and computer programs recorded on one or more computer storage devices, each configured to perform the actions of the methods.

Implementations may include one or more of the following features. In some implementations, the virtual focus model includes data specifying at least one of a depth of field for the camera, a focal point for the camera, and/or a focal length of a lens of the camera. In some implementations, the virtual focus model includes data specifying a set of bokeh, vignette, or lemmoning effects for one or more virtual scene elements to be applied to the virtual scene elements when rendering the virtual scene. In some implementations, the captured scene includes an optical view of the stage environment, where the stage environment is a movie set, and where the virtual scene display is positioned in the stage environment further from the camera than at least one live actor visible in a camera scene captured by the camera. In some implementations, the adjusted focus includes a defocus of the given virtual scene element to, at least approximately, match a presumed defocus the given virtual scene element would have if the given virtual scene element were present at a presumed distance from the camera that corresponds to a function of a first distance from the camera to the virtual scene display and the depth value of the given virtual scene element. In some implementations, the function of the first distance and the depth value is a sum of the first distance and the depth value. In some implementations, determining the camera position includes reading data from camera position sensors placed on the camera. In some implementations, determining the display position includes reading data from display position sensors placed on the virtual scene display. In some implementations, determining the camera position and determining the display position include receiving manually entered position data. In some implementations, determining the virtual focus model is based, at least in part, on predetermined parameters defining lens characteristics of a lens used on the camera. In some implementations, the virtual scene display includes an LED wall. In some implementations, the LED wall is positioned as a background in the stage environment and spans an entirety of a scene captured by the camera. In some implementations, the LED wall is planar, piecewise planar, or where at least a portion of the led wall has a curved portion. In some implementations, the virtual scene display is planar and perpendicular to a camera lens axis. Some implementations include a non-transitory computer-readable storage medium storing instructions, which when executed by at least one processor of a computer system, causes the computer system to carry out the method. Some implementations include a computer-readable medium carrying instructions, which when executed by at least one processor of a computer system, causes the computer system to carry out the method. Some implementations include computer system including: one or more processors; and a storage medium storing instructions, which when executed by the one or more processors, cause the computer system to implement the method. Some implementations include a carrier medium carrying image data that includes pixel information generated according to the method.

One general aspect includes a computer-implemented method of determining a virtual focus model for a camera apparatus. The method includes generating a first calibration image; determining a camera position of the camera apparatus in the stage environment; determining a display position of the virtual scene display in the stage environment; setting the camera apparatus to have a first state of the optical path; capturing a first captured image of the stage environment with the camera apparatus in the first state, where the first captured image includes a first view of at least a first portion of the virtual scene display displaying the first calibration image; setting the camera apparatus to have a second state of the optical path; capturing a second captured image of the stage environment with the camera apparatus in the second state, where the second captured image includes a view of at least a second portion of the virtual scene display displaying the first calibration image; comparing the first captured image and the second captured image to derive a focus parameter, based at least in part on the camera position and the display position; and providing the focus parameter as a computer-readable portion of the virtual focus model. Other implementations of this aspect include corresponding computer systems, apparatus, and computer programs recorded on one or more computer storage devices, each configured to perform the actions of the methods.

Implementations may include one or more of the following features. In some implementations, the focus parameter includes one or more of a depth of focus for the camera apparatus, a focal point for the camera apparatus, or an aberration effect of the camera apparatus. In some implementations, the camera apparatus includes a stereoscopic optical path and at least two image capture elements. In some implementations, the computer-implemented method further including: adjusting a focus of the camera apparatus continuously through a rack focus range; and recording image capture of the stage environment as the focus is adjusted. Examples can be found in U.S. patent application Ser. No. 17/378,503 to Hayes et. al, "SMOOTHLY CHANGING A FOCUS OF A CAMERA BETWEEN MULTIPLE TARGET OBJECTS", filed Jul. 16, 2021, hereby incorporated by reference as though fully set forth herein. In some implementations, the computer-implemented method further including adjusting the first calibration image while recording the image capture of the stage environment as the focus of the camera apparatus is adjusted. In some implementations, adjusting the focus of the camera apparatus or setting the camera apparatus to have a second state of the optical path includes adjusting a focus of the camera apparatus by moving the camera apparatus. In some implementations, adjusting the focus of the camera apparatus or setting the camera apparatus to have a second state of the optical path includes adjusting a motion control head of the camera apparatus or manually adjusting a focus of the camera apparatus with a positional encoder. In some implementations, the first captured image includes a first view of at least a first portion of the virtual scene display displaying the first calibration image and the second calibration image; and capturing the second captured image of the stage environment with the camera apparatus in the second state, where the second captured image includes a view of the at least the second portion of the virtual scene display displaying the first calibration image and the second calibration image. In some implementations, the first calibration image includes at least one of lines, circles, polygons, and/or photographic images. In some implementations, the first calibration image includes shapes of varying sizes, line weights, or colors. In some implementations, the first calibration image is two-dimensional. In some implementations, the first calibration image includes two-dimensional elements at different depths or plane orientations. In some implementations, the first calibration image is three-dimensional. In some implementations, the first calibration image is positioned in the virtual scene at a depth of a surface of the virtual scene display. In some implementations, the first calibration image is positioned in the virtual scene at a depth different than a surface of the virtual scene display. In some implementations, the first calibration image is animated. Some implementations include a non-transitory computer-readable storage medium storing instructions, which when executed by at least one processor of a computer system, causes the computer system to carry out the method. Some implementations include a computer-readable medium carrying instructions, which when executed by at least one processor of a computer system, causes the computer system to carry out the method. Some implementations include a computer system including: one or more processors; and a storage medium storing instructions, which when executed by at least one processor, cause the computer system to implement the method. Some implementations include a carrier medium carrying image data that includes pixel information generated according to the method.

One general aspect includes a computer-implemented method of generating a rendering of a virtual scene. The method includes determining a camera position of a camera in a stage environment that is to be used to capture the captured scene; determining a display position of a virtual scene display in the stage environment; determining a set of depth slices, where a depth slice of the set of depth slices represents a subregion of the virtual scene space; determining a blur factor for the depth slice based at least in part on the camera position, the display position, and a depth value or depth range for the subregion of the virtual scene space represented by the depth slice; determining which of the plurality of virtual scene elements can be assigned to which depth slices of the set of depth slices; and rendering the virtual scene taking into account blur factors for virtual scene elements based at least in part on depth slices of the virtual scene elements. Other implementations of this aspect include corresponding computer systems, apparatus, and computer programs recorded on one or more computer storage devices, each configured to perform the actions of the methods.

Implementations may include one or more of the following features. In some implementations, the method further includes determining a scaling between a first distance measurement in the stage environment and a second distance measurement in the virtual scene. In some implementations, each blur factor is a function of a virtual distance in the virtual scene space and/or a distance measurement in the stage environment from a focal point of the camera. In some implementations, determining each blur factor includes computing a transparency for pixels associated with object edges associated with a blurred virtual scene element. In some implementations, each blur factor is applied as part of the rendering of the virtual scene. In some implementations, each blur factor is applied to pixels of the rendered virtual scene that are associated with a respective blurred virtual scene element. In some implementations, the blur factor of the respective virtual scene element is updated when a change occurs to at least one of the camera position, the depth slice of the respective virtual scene element, and/or a focus parameter of the camera. In some implementations, each depth slice of the set of depth slices is of the same thickness as the other depth slices of the set of depth slices. In some implementations, at least one depth slice of the set of depth slices is of different thickness from at least one other depth slice of the set of depth slices. In some implementations, the depth slices of the set of depth slices are contiguous. In some implementations, at least one depth slice of the set of depth slices is not contiguous with any other depth slice of the set of depth slices. In some implementations, the depth slices of the set of depth slices are planar. In some implementations, the depth slices of the set of depth slices spherical sections. Some implementations include a non-transitory computer-readable storage medium storing instructions, which when executed by at least one processor of a computer system, causes the computer system to carry out the method. Some implementations include a computer-readable medium carrying instructions, which when executed by at least one processor of a computer system, causes the computer system to carry out the method. Some implementations include a computer system including: one or more processors; and a storage medium storing instructions, which when executed by the one or more processors, cause the computer system to implement the method. Some implementations include a carrier medium carrying image data that includes pixel information generated according to the method.

One general aspect includes a computer-implemented method of generating a virtual scene rendering usable in a captured scene. The method includes determining a camera position of a camera in a stage environment; determining a mapping of a plurality of subregions of a virtual scene display in the stage environment to corresponding positions in the stage environment; for a given virtual scene element: a) determining a corresponding subregion of the plurality of subregions for the given virtual scene element, where the corresponding subregion corresponds to where on the virtual scene display the given virtual scene element would, at least in part, appear; b) determining a stage subregion depth value for the corresponding subregion, where the stage subregion depth value represents a distance from the corresponding subregion to at least one of the camera position and a focal point of the camera based, at least in part, on the mapping of the plurality of subregions to the corresponding positions in the stage environment; c) determining a virtual subregion depth value based, at least in part, on a depth value for the given virtual scene element; and d) determining a blur factor for the corresponding subregion based at least in part on the stage subregion depth value and the virtual subregion depth value; and rendering the virtual scene taking into account the blur factor for the given virtual scene element.

Implementations may include one or more of the following features. In some implementations, the virtual scene display varies from a plane perpendicular to a camera optical axis. In some implementations, the corresponding subregion includes an N×N pixel array. In some implementations, the corresponding subregion includes a single pixel. In some implementations, each subregion of the plurality of subregions is of a same size or number of pixels as the other subregions in the plurality of subregions. In some implementations, at least one subregion of the plurality of subregions is of a different size or number of pixels than at least one other subregion of the plurality of subregions. In some implementations, the subregions of the plurality of subregions are contiguous. In some implementations, at least subregion of the plurality of subregions is not contiguous with any other subregion of the plurality of subregions. In some implementations, determining each blur factor includes computing a transparency for pixels associated with object edges associated with a virtual scene element within a blurred subregion. In some implementations, each blur factor is applied as part of the rendering of the virtual scene. In some implementations, each blur factor is applied to pixels of the rendered virtual scene that are associated with a respective blurred subregion. In some implementations, the blur factor of the respective blurred subregion is updated when a change occurs to at least one of the camera position, the respective subregion of the respective virtual scene element, and/or a focus parameter of the camera. Some implementations include a non-transitory computer-readable storage medium storing instructions, which when executed by at least one processor of a computer system, causes the computer system to carry out the method. Some implementations include a computer-readable medium carrying instructions, which when executed by at least one processor of a computer system, causes the computer system to carry out the method. Some implementations include a computer system including: one or more processors; and a storage medium storing instructions, which when executed by the one or more processors, cause the computer system to implement the method. Some implementations include a carrier medium carrying image data that includes pixel information generated according to the method.

One general aspect includes a computer-implemented method for generating a virtual scene rendering of a captured scene. The computer-implemented method includes determining a camera position of a camera in a stage environment; determining a display position of a virtual scene display in the stage environment; determining focus parameters of the camera; determining a depth value for a given virtual scene element viewable as an image on the virtual scene display, where the depth value corresponds to a virtual distance in the virtual scene between the given virtual scene element and a virtual camera viewpoint located at the camera position; determining a desired focus model, based at least on: the focus parameters of the camera; the depth value; and a desired lens effect; determining an adjusted focus for the given virtual scene element based on the desired focus model; and applying at least a portion of the adjusted focus to at least one of: the focus parameters of the camera; the image of the given virtual scene element on the virtual scene display; or pixels representing the given virtual scene element in a composite image, captured by the camera, of the stage environment and the virtual scene display. Other implementations of this aspect include corresponding computer systems, apparatus, and computer programs recorded on one or more computer storage devices, each configured to perform the actions of the methods.

Implementations may include one or more of the following features. In some implementations, applying the at least a portion of the adjusted focus includes applying the entire adjusted focus to the focus parameters of the camera. In some implementations, applying the at least a portion of the adjusted focus includes applying the entire adjusted focus to the image of the virtual scene element on the virtual scene display. In some implementations, Applying the at least a portion of the adjusted focus includes applying the entire adjusted focus to the pixels representing the given virtual scene element in the composite image. In some implementations, the focus parameters of the camera include at least one of a depth of field for the camera, a focal point for the camera, a focal length of a lens of the camera, or predetermined parameters defining lens characteristics of a lens used on the camera. In some implementations, the desired lens effect includes at least one of a bokeh, vignette, lemmoning, lens flare, diopter, aberration, fisheye, filter, mask, slit, or grating effect. In some implementations, the composite image includes an optical view of the stage environment, where the stage environment is a movie set, and where the virtual scene display is positioned in the stage environment further from the camera than at least one live actor visible in a camera scene captured by the camera. In some implementations, the virtual scene display includes an LED wall. In some implementations, the virtual scene display is positioned as a background in the stage environment and spans an entirety of a scene captured by the camera. In some implementations, the given virtual scene element is within a viewing frustum of the camera. In some implementations, the given virtual scene element is outside a viewing frustum of the camera, and the stage environment is lit at least in part by light emitted by the given virtual scene element. In some implementations, the image of the given virtual scene element on the virtual scene display is a low-resolution, low-frame-rate, or low-dynamic-range image. In some implementations, the pixels representing the given virtual scene element in the composite image are replaced with second pixels of a high-resolution, high-frame-rate, or high-dynamic range second image. Some implementations include a non-transitory computer-readable storage medium storing instructions, which when executed by at least one processor of a computer system, causes the computer system to carry out the method. Some implementations include a computer-readable medium carrying instructions, which when executed by at least one processor of a computer system, causes the computer system to carry out the method. Some implementations include a computer system including: one or more processors; and a storage medium storing instructions, which when executed by the one or more processors, cause the computer system to implement the method. Some implementations include a carrier medium carrying image data that includes pixel information generated according to the method. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the methods, as defined in the claims, is provided in the following written description of various implementations of the disclosure and illustrated in the accompanying drawings.

BRIEF DESCRIPTION OF THE DRAWINGS

Various implementations in accordance with the present disclosure will be described with reference to the drawings, in which:

FIG. 11 illustrates an example of defocusing a virtual object, in accordance with at least one implementation of the present disclosure.

DETAILED DESCRIPTION

Figure 1:
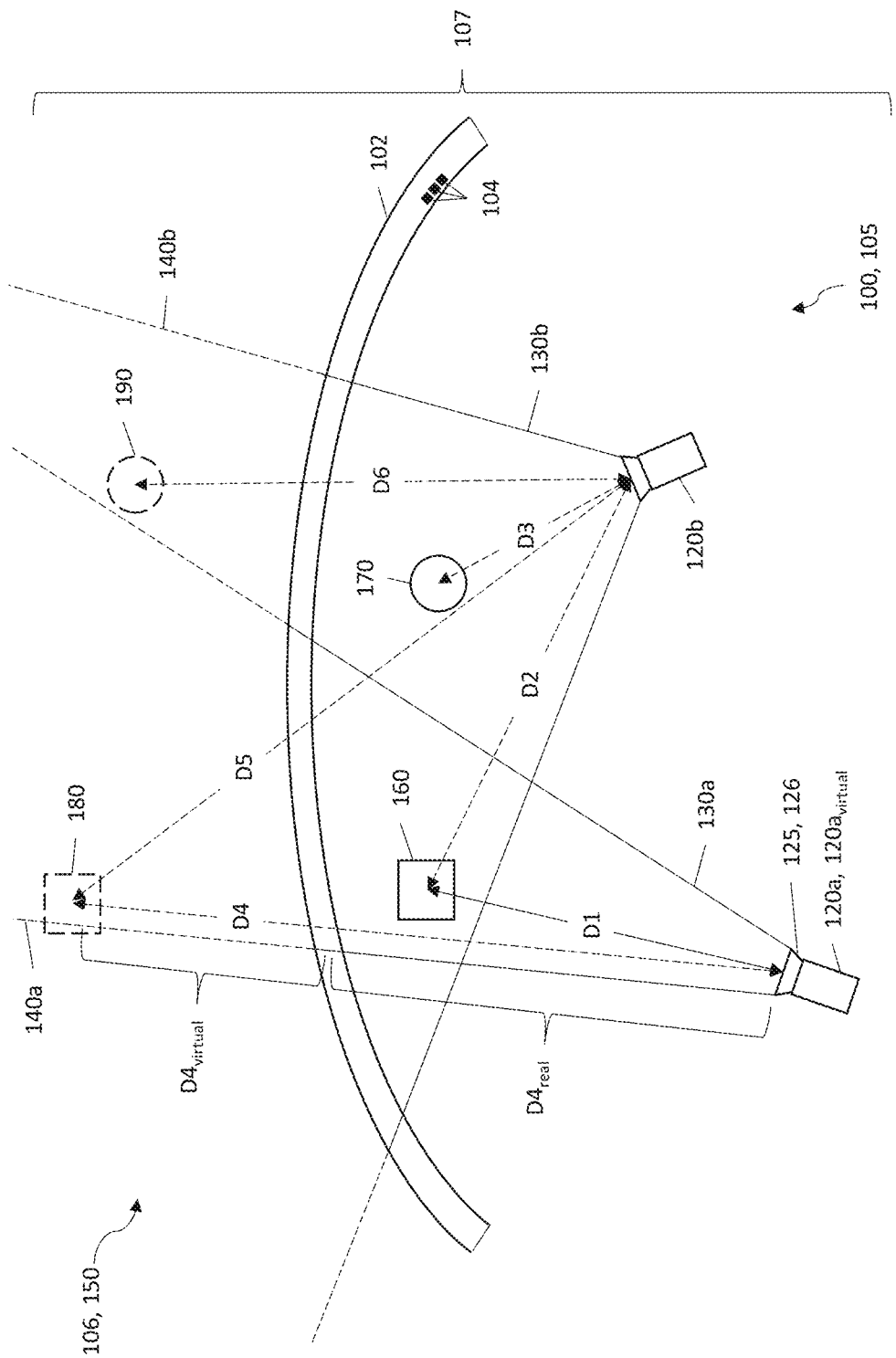
FIG. 1 illustrates an example real-world stage, in accordance with at least one implementation of the present disclosure.

In the following description, various implementations will be described. For purposes of explanation, specific configurations and details are set forth in order to provide a thorough understanding of the implementations. However, it will also be apparent to one skilled in the art that the implementations may be practiced without the specific details. Furthermore, well-known features may be omitted or simplified in order not to obscure the implementation being described.

A virtual scene might be represented by data corresponding to pixels in image space. The deep image might be generated from virtual objects described in a scene space and then by rendering, or otherwise, is represented in an image dataset that might specify, for example, for each pixel in a pixel array, a pixel image value array. Each entry in the pixel image value array might comprise a pixel color value, an optional alpha value, a depth value or a depth range, and an object identifier identifying which object contributes that color/alpha at the specified depth. The pixel image value array might be associated with a particular pixel by an explicit reference to an associated pixel position or the particular pixel might be determinable by a position of the pixel image value array within the image dataset.

Computer simulation that is used with live actors may be placed into a live action scene in different ways. Conventionally, live actors may act in front of a green screen or other colored background that allows for chroma keying to provide visual effects in post-production and after a live action scene is captured. This may be used to provide different background effect, which allows for providing computer simulated effects, backgrounds, and the like with live actors. However, chroma key compositing may suffer from issues of realism when adding visual effects in post-production. For example, the green screen does not include any computer simulation and/or animation when the live actor is acting in the live action scene. Thus, the live actor may be required to pretend that certain animated portions of the scene are present. This may be an issue where those animated elements are interacted with by the live actor, such as an environmental object and/or character. A live actor may not know exactly where a cliff or edge may be when later added as animated elements or may not know the exact location of a character or creature that the live actor is engaging with in the live action scene. Further, the green screen used for chroma keying does not provide lighting or colors, which may be projected onto the live actor (e.g., in the case of an explosion or the like) or may be reflected in the live actors' eyes, glasses, wardrobe pieces, or the like.

In this regard, a display wall may be used, which may include a display screen (e.g., an LED, LCD, LED LCD, OLED, or the like) that is capable of outputting a rendering of an image or a video. The rendering may correspond to a precursor image, which may be an image from a renderer or a compositor. This image may be entirely or partially computer generated and/or animated, may be captured earlier from a live action scene, or a combination thereof. The precursor image may be a single image displayed on the display wall or may be a sequence of images, such as frames of a video or animation. The precursor image may include precursor metadata for computer generated imagery and/or pixel display data for pixels of the display wall. In this regard, the precursor metadata may include output pixels, data, color, intensity, and the like for outputting the image on the display wall.

The display wall may correspond to one or more structures that are then positioned in the real-world live action scene, and may be planar, curved, or the like. In this regard, the display wall may serve as a background, however, this may not be the only orientation and the display wall may also be placed above, next to, or otherwise oriented with regard to a live actor. The display wall may be placed relative to a scene or stage element, such as a live actor or other object in the 3D real-world scene for the live action. The live actor then acts and interacts with the live action scene corresponding to the real-world environment that is being captured by one or more cameras. The live action scene may also be captured by other sensors and/or sensing devices, including optical sensing devices, depth sensors and/or ranging sensors (e.g., LiDAR), and the like.

When the live actor interacts with and/or performs in the live action scene, the display wall may output one or more precursor images that may be used with the live actor to capture image data. This image data may be captured by one or more or more cameras. For example, a camera may be oriented relative to the 2D display wall to capture background imagery and pixels of the 2D display wall while stage elements are present in a live action scene in front of and/or relative to the 2D display wall. In some implementations, the image data may be stereoscopically captured by two or more cameras may be placed proximate to each other in different locations so that the cameras may capture different angles of the live action scene. In some implementations, the cameras may be oriented so as to mimic how a person or creature may view the live action scene, such as how a human that would view the live action scene. This may be used to provide additional realism to capturing the live action scene and/or capture the live action scene in 3D so that the image data may later be rendered and output in 3D when viewed by an audience.

The live actor may be engaging with the display wall and/or other elements and objects in the live action scene while computer generated imagery is being generated by a renderer and displayed on the display wall. The display wall may also emit or output light, colors, and the like that are projected on and/or reflected by the live actor or other objects in the live action scene. An image processor may, in real-time, near real-time, or at a later post-processing time, determine which portions of the captured image data correspond to the live actor, and which portions correspond to the display wall (e.g., background or display wall pixels). The portions may correspond to individual pixels of the display wall and/or live actor in the image data and may be different between different image data captured by each camera. The image processor may then generate an image mat, which may be generated and/or stored as a pixel array where values or data for pixels in the pixel array indicate whether the corresponding pixel is part of the display wall or another foreground actor, object, or the like in the live action scene.

The image matte may then be used to selectively modify pixels in the precursor metadata for the displayed precursor image to change the output or rendering of those pixels when displayed on the display wall and/or captured in the camera image data. In some implementations, the image matte may be a binary mat, a junk matte (e.g., where pixels are identified as part of the display wall, not part of the display wall, and/or uncertain as to whether those pixels belong to the display wall). For example, the image matte may be used to modify pixels that correspond to the display wall when a precursor image is being displayed on the display wall or at a later time when the stereoscopic image data is processed and background pixels are moved, warped, adjusted, and/or re-rendered. Thus, the image matte may correspond to an alpha channel image that may allow for modification, adjustment, and/or change of one or more portions of the stereoscopic image data (e.g., the live actor, the display wall, or another portion of the image data).

In this regard, the precursor metadata may include a scene description with information about the 3D position of a computer-generated objects, characters, or the like in the precursor image for the display wall. Modification of pixels corresponding to the display wall may include replacement of pixel color values and/or pixel outputs that correspond to the display wall to the pixel values that would have actually been captured (including focus levels varying with depth) if the precursor image on the display wall actually existed in the live action scene and real-world 3D environment. This may allow cameras to capture images of the live actor in front of the display wall, but with focal properties of virtual objects modified according to depth, so that the captured image data appears as if the precursor image was actually present in 3D instead of 2D on the display wall. Thus, a renderer and/or compositor system may perform pixel replacement corresponding to the display wall, taking into account precursor metadata of the precursor image on the display wall, to present a processed precursor image on the display wall for an image in a live action scene.

The image processor may generate the image matte using different techniques. For example, the image processor may determine the image matte by computing the image matte, from the precursor image metadata and/or display wall metadata (e.g., information for placement of the display wall, depths to 3D stage elements and/or cameras, lighting or effects in the real-world environment, etc.) with the image data based on what the camera "should" see based on its lens characteristics and settings. Further, the image processor may determine where the display wall is in a scene, such as a distance or depth from the cameras to the display wall, to identify those pixels that correspond to the display wall and those that correspond to a foreground object or live actor.

Once the image processor determines the image mat, the image processor may execute different processes with the image mat. For example, the image processor may "splat" or otherwise blur certain pixels, as well as potentially adjusting, moving, and/or warping pixels of the precursor image from a camera position and/or camera settings with the precursor metadata and/or display wall metadata. This may be based on the position of the actual camera and display wall at the time of capture and the adjustments or replacement pixels may be generated using the image matte to appear as a 3D image or imagery on the display wall. Depth may also be determined using one or more depth sensors for pixel identification and replacement. Further, this may account for different types of cameras capturing the scene, such as a "hero" camera for a main camera capturing the important or main elements of the live action scene (e.g., the live actor), as well as non-hero cameras.

Although the pixels are referred to as replacement pixels, the pixels may instead be data and/or metadata that cause changing, warping, adjusting, or moving original background pixels associated with the display wall instead of directly replacing such pixels. Adjusting pixels may include warping or changing pixels, which may change pixel values or data (e.g., color, brightness, transparency, luminosity, effect, intensity, and/or the like). Thus, pixel adjustments may include changes to pixel values and data in image data instead of or in addition to direct replacement of pixels with another or different pixel.

A scene may be defocused by applying a lens blur filter with different parameters to give the resulting image a depth of field effect similar to what may be achieved in a photograph taken with a physical camera. Existing methods of doing so can be computationally expensive and achieve limited results. For example, a scene may be divided into vertical layers based on the distance of pixels from a virtual camera, and a blurring effect may be applied to each layer. The blurring effect applied, however, may be uniform throughout a layer (e.g., every pixel in the layer is blurred by the same amount), resulting in images that lack detail, particularly when a narrow depth of field is involved.

In a specific example, a scene description might describe tree objects in a forest of trees. An image dataset might be provided to an animator that is a deep image of that scene, rendered into a deep image. It may be desirable to defocus objects within the scene to draw attention to different objects in the scene in a way that emulates the depth of field effect of a physical camera. For example, trees in the background may be defocused while focus is placed on a running character. Achieving a desired result for the look of a scene may require experimentation with different parameters such as the amount of blur to be applied, a lens shape, and a lens effect. Modifications to any of the parameters may require rendering a scene again to view the result of the modifications. Therefore, it would be useful to be able to defocus objects or sections of a scene post-rendering, in real time or near-real time on the display wall, without requiring re-rendering the scene.

The present disclosure aids substantially in generating visual content such as movies and videos, by improving the realism of virtual sets, reducing the amount of computation required to render them realistically, and reducing or eliminating the need to combine "green-screen" live action footage with computer-generated content. Implemented on a display in communication with a processor, the defocusing systems, method, and devices disclosed herein provide practical improvement in the rendering of visual images on displays such as video wall backdrops. This improved dynamic backdrop capability or real-time matte capability transforms a multi-step production process into a simple stage production, without the normally routine need to combine multiple independent video streams into a single moving image. This unconventional approach improves the functioning of a movie soundstage, by permitting actors and props to be photographed in front of moving, realistically focused background scenes that emit light and create shadows in realistic ways.

FIG. 1 illustrates an example real-world stage 100, in accordance with at least one implementation of the present disclosure. The real-world stage comprises a real-world scene 105, which includes a display wall 102 (also known as a video wall, LED wall, digital wall, virtual scene display, virtual backdrop, dynamic backdrop, or virtual production display), behind which exists a virtual space 150 that may for example be populated with digital scenes, objects, characters, environments, etc., which collectively represent a virtual scene 106 that may be displayed as one or more 2D images on video wall 102, thus creating a combined physical and virtual stage 107 (also referred to as a combined scene, combined real-world scene, or virtual production set). While various examples herein may refer to a display device as a video wall, it should be clear that the display device could extend the entirety of the background of a real-world stage scene, extend partially so, and/or could be planar, curved, piecewise linear, or in some other configuration.

Display wall 102 exists at a particular position or set of positions on the real-world stage. Display wall 102 may correspond to a liquid crystal display (LCD), a light-emitting diode (LED) display, plasma display, a combination thereof, or the like (including LCD LED, thin-film transistor (TFT) LCD, OLED, etc.), projection display, etc. In this regard, display wall 102 may comprise pixels 104, which may be used to emit light of certain colors, intensities, and other parameters when outputting and displaying one or more images. Pixels 104 may be picture elements or image elements that may correspond to the smallest point or controllable element of display wall 102 that may make up imagery displayed on display wall 102. This may be used to display a virtual scene 106 from a renderer, which may correspond to computer-generated imagery, early captured or recorded live action scenes and/or objects, or a combination thereof. In order to display scene 106 on display wall 102 using pixels 104, a renderer and/or compositor may be used for image processing and output. Scene 106 may correspond to a precursor image that is displayed on display wall 102. A precursor image may be one or multiple individual images, which may be displayed in sequence, such as frames of an animation or video. The precursor image for scene 106 may therefore be provided by a renderer and/or may be processed using a compositor. The precursor image may also be associated with precursor metadata that may include computer-generated imagery metadata, such as the scene description for scene 106 that is used in rendering and outputting scene 106 on display wall 102 using pixels 104.

A renderer may correspond to hardware and/or software that generates one or more images, or data usable for representing those images, based on a scene description, which may be single images or frame of an animation or video. A compositor may correspond to hardware and/or software that may combine image data of a captured live action scene and a rendered scene to form composited imagery. The captured live action scene may be captured as image data, such as that of a live actor performed during recording, and live action metadata of the capturing of the scene, such as camera settings, camera positions, lighting conditions, visual effects, etc.

Display wall 102 may correspond to one or more structures that may be positioned in a live action scene and be capable of displaying imagery from a renderer, compositor, or the like. In some instances, display wall 102 may be a single, planar display and therefore provide a 2D output of virtual scene 106. In other instances, display wall 102 may correspond to one of a plurality of planar or curved elements and/or display panels and/or may include multiple display panels in varying positions or orientations to generate a single wall for precursor imagery. Display wall 102 may correspond to an LED wall or other structure capable of displaying imagery. Display wall 102 may correspond to a background of a live action scene, but it is not necessary display wall 102 is a background and instead may be orientated and/or otherwise placed in a live action scene. Display wall metadata for display wall 102 may correspond to data that represents details of display wall 102, such as its construction, its orientation, resolution, size, etc., and its position in the live action scene. In some implementations, this may be measured or determined by one or more depth, distance, and/or ranging sensors, which may be used in combination with optical cameras and/or sensors for distance finding between real-world 3D objects and/or display wall 102 and one or more cameras. In some instances, display wall 102 may partially or completely encircle stage 100. In some instances, display wall 102 may be or may include a ceiling or floor portion. In some instances, display wall 102 may be a dome or other three-dimensional shape.

In the example shown in FIG. 1, stage 100 includes a first camera, first camera position, or first real-world camera 120a having a viewing frustum 130a that extends toward video wall 102, and a corresponding virtual viewing frustum 140a that extends "behind" video wall 102 and into virtual space 150. The size and shape of viewing frustum 130a and virtual viewing frustum 140a may depend for example on lenses, shades, apertures, etc. of first camera 120a. A second camera, second camera position, or second real-world camera 120b has a viewing frustum 130b and corresponding virtual viewing frustum 140b. In some cases, for realism and to minimize the need for post-production editing, the viewing frustum of a camera may be selected such that the scene viewable by the camera falls within the boundaries of video wall 102, although in some cases the viewing frustum may encompass at least a portion of a floor, ceiling, or wall of stage 100, where the floor, ceiling, or wall includes practical set elements whose presence in the viewing frustum is desired.

Located on stage 100 is a first physical object or scene element 160 (e.g., an actor, stage prop, etc.), which is visible to both first camera 120a and second camera 120b. A physical distance, range, relative position, or depth D1 exists between first camera 120a and first physical object 160. This physical distance or stage environment distance D1 may for example be a distance measurement generated by one or more sensors. Depending on selected lens 125 and focus settings 126 of first camera 120a, object 160 may be in focus, or may be defocused to a certain degree that depends on the range D1. Focus settings 126 may also be referred to as focal settings, focal parameters, lens settings, lens parameters, etc. For example, an operator may wish to de-emphasize foreground or background objects such that a viewer's attention is drawn to characters or objects at a middle distance. In some instances, either or both of the range D1 or focus settings 126 (including zoom level, depth of field, a focal point, a focal length, aberration, and/or bokeh, vignette, or lemmoning effects) may change dynamically while a scene is being filmed. For example, a camera operator or camera operation algorithm may adjust the focus of the camera continuously through a rack focus range, recording image capture of the stage environment as the focus is adjusted. In some implementations, the system may also include a feedback loop between a blur factor of the virtual object 180 and the focus settings 126 of the camera 120, to make sure that changes in the real blur or defocus are matched by changes in the virtual blur or defocus.

Similarly, a physical distance D2 exists between second camera 120b and first physical object 160, which may be in or out of focus in view of camera 120b. A second physical object or scene element 170 is also positioned on stage 100, at a range D3 from second camera 120b. second physical object 170 is positioned within viewing frustum 130b of second camera 120b, and thus second physical object 170 is visible to second camera 120b. However, second physical object 170 is positioned outside of viewing frustum 130a of first camera 120a, and so second physical object 170 is not visible to first camera 120a, unless first camera 120a reorients, or second physical object 170 moves, such that second physical object 170 falls within viewing frustum 130a of first camera 120a.

Positioned within virtual space 150, "behind" video wall 102, is a first virtual object or virtual scene element 180, with a given position, size, shape, and orientation within virtual space 150. first virtual object 180 may be stored in a processor memory and/or may be rendered as pixels 104 on video wall 102. viewing frustum 130a of first camera 120a extends into virtual space 150 as a virtual viewing frustum 140a. Similarly, viewing frustum 130b of second camera 120b extends into virtual space 150 as a virtual viewing frustum 140b. Because first virtual object 180 falls within both virtual viewing frustum 140a and virtual viewing frustum 140b, first virtual object 180 is visible to both first camera 120a and second camera 120b. In some instances, switching to a different camera view may require updating images on the display wall 102 to account for a different virtual camera position and orientation.

A range, distance, relative position, or depth D4 between the first camera or first camera position 120a and first virtual object 180 exists, e.g., the distance, on a straight line connecting first camera 120a with first virtual object 180. The range, distance, or depth D4 includes a real component $D4_{real}$, representing the distance between first camera 120a and display wall 102, and a virtual component IN-virtual, representing the distance, in virtual space 150, between video wall 102 and first virtual object 180. The video wall or display wall 102 may be a physical object (or arrangement of objects) on the stage, for which there may be no corresponding virtual object in virtual space 150. In some implementations, the first camera or first camera position 120a may correspond to a virtual camera $120a_{virtual}$ in the virtual space, although this may not always be the case. Although first virtual object 180 is not "real", it can be treated mathematically as though it were physically present on stage 100, at a range, depth, or distance of D4 from first camera 120a. Henceforth in this document, it should be understood that any distance, depth, or range expressed between a physical camera and a virtual object may be a sum of a real distance, depth, or range and a virtual distance, depth, or range, but can be treated mathematically as a real distance between the camera and a real object. For example, a range, depth, or distance D5 separates first virtual object 180 from second camera 120b.

Virtual space 150 also contains a second virtual object or virtual scene element 190, which falls outside virtual viewing frustum 140a and is thus not visible to first camera 120a. However, second virtual object 190 falls within virtual viewing frustum 140b and is thus visible to second camera 120b. A range, distance, or depth D6 exists between second camera 120b and second virtual object 190. Real-world scene 105 and virtual scene 106 collectively form a combined scene or combined real-world scene 107.

In some aspects, lens effects may be simulated partially or entirely using the display wall 102. For example, real world camera 120a may incorporate a lens setup with wide depth of field and a focus out to a large distance (e.g., infinity), whereas defocus for virtual objects displayed on the video wall 102 may be based on their depth. In other aspects, a virtual focus model of virtual camera $120a_{virtual}$ may be employed to introduce lens effects such as lens flare, diopters (e.g., to defocus edges of a scene differently than central regions), aberrations, fisheye, filters, masks, slits, gratings, etc. to the images on the display wall 102. This may advantageously permit lens effects to be changed rapidly, in real time or near-real time, without the need to change the lens 125 or lens settings 126 of camera 120a. In other aspects, both the camera 120a and the display wall 102 may show objects in sharp focus, while blur or defocus effects may be added to or removed from real or virtual objects in a post-processing step. Thus, in a final rendered image, the focus level or blur level of any real object or virtual object visible in the image may be a combined function of camera focus, display wall defocus or blur effects, and post-processing defocus or blur effects. Such a setup may advantageously permit lens effects to be added, removed, or modified at various stages of production, including on the display wall 102 in real time, without the need to change cameras or lenses. In scenes that are predominantly virtual, it may be advantageous to introduce lens effects exclusively on the display wall 102, or exclusively in the post-processing step.

In some aspects, images shown on the display wall 102 may not be within the viewing cone of a camera at all. This may for example occur where the display wall 102 is employed for dynamic lighting effects. For example, if a virtual object "behind" the display wall 102 is a fire, explosion, or other radiant phenomenon, then realistically lighting the face of a real-world actor or object, proximate to virtual object, may require realistically defocusing an image of the virtual object on the display wall 102, even if the virtual object (or indeed, the entire display wall 102) is not in frame.

In some aspects, low-resolution, low-frame-rate, or low-dynamic-range images may be shown on the video wall 102, in order to provide lighting effects to objects or actors on the real-world stage and/or to provide actors with rough images to guide their movements, speech, and actions. In such cases, some or all portions of the video wall imagery may be replaced during post-processing with higher-resolution, higher-frame-rate, or higher-dynamic-range images. Virtual objects may also be added, deleted, moved, or altered during this post-processing step. In other aspects, a high frame rate for the display wall 102 may allow multiple images to be displayed in an alternating fashion, e.g., to provide stereo imagery.

Figure 2:
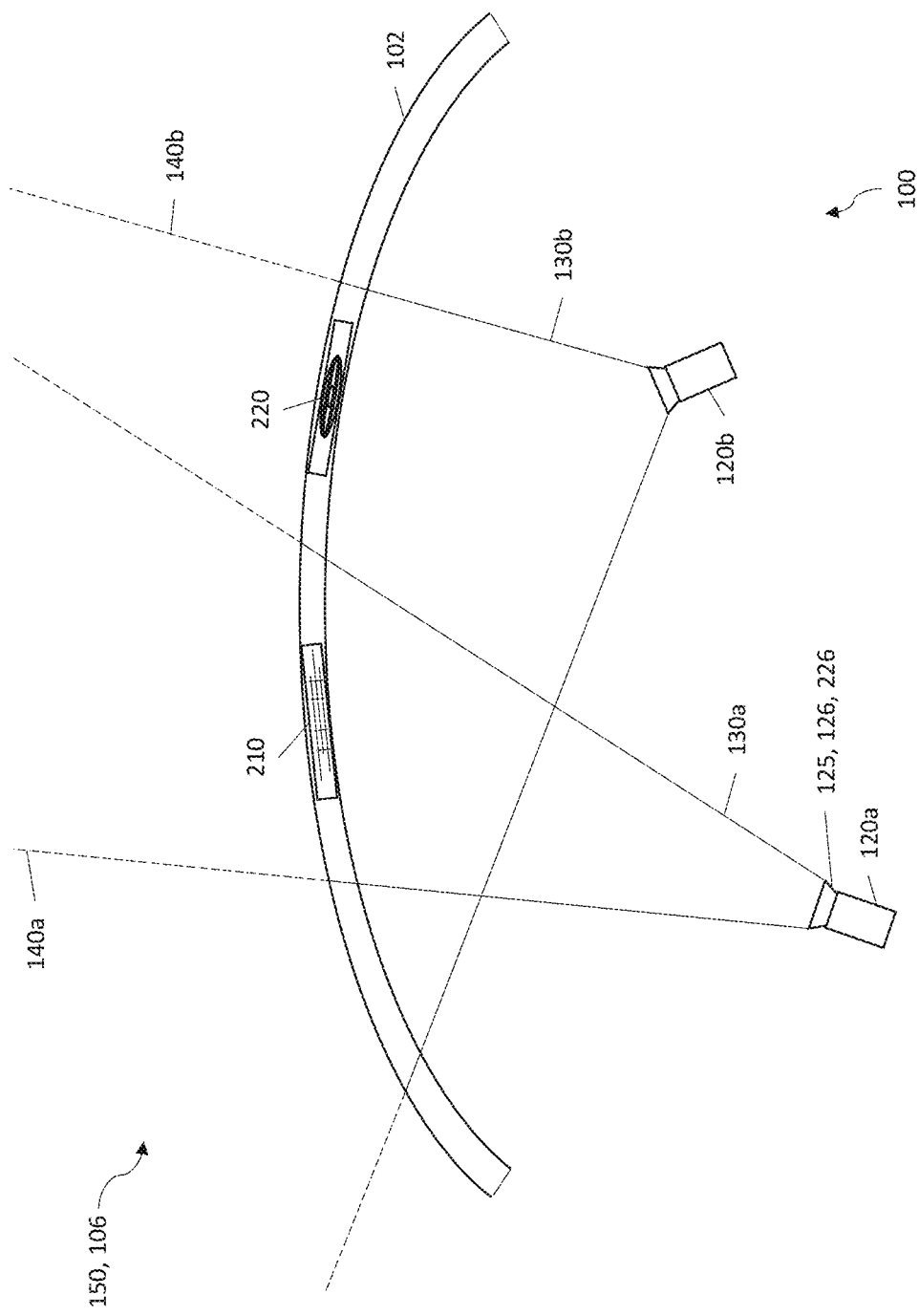
FIG. 2 illustrates an example real-world stage, which includes a display wall, behind which exists a virtual space comprising a virtual scene, in accordance with at least one implementation of the present disclosure.

FIG. 2 illustrates an example real-world stage 100, which includes a display wall or video wall 102, behind which exists a virtual space 150 comprising a virtual scene 106, in accordance with at least one implementation of the present disclosure. A real-world stage 100 is an environment in which a camera (e.g., camera 120*a* or 120*b*) can capture light, and possibly other data, from what is in front of the camera. The camera can be an optical device that captures light, visible and/or not visible, from elements present in the real-world stage 100. Examples of real-world stages include sound stages, outdoor scenery, and other places where image capture might take place using a camera or optical device positioned before the real-world stage.

A real-world scene (e.g., real-world scene 105 of FIG. 1) is a scene of real-world scene elements (such as, for example, physical objects 160 and 170 of FIG. 1), images of which can be captured by a camera. Real-world scene elements might comprise actors, characters, beings, objects, lighting, etc. that are visible within a viewing frustum (e.g., viewing frustum 130*a* or 130*b* of FIG. 1) of a real-world camera, or could affect what is captured by the real-world camera.

A virtual scene (e.g., virtual scene 106 of FIG. 1) is a scene described by computer-readable data structures that may include virtual scene elements (e.g., virtual objects 180 and 190 of FIG. 1), lighting information, one or more virtual camera viewpoints, and one or more virtual cameras view frame. In the case of stereoscopic virtual scenes, there might be at least two virtual camera viewpoints. A virtual scene need not be physically realizable, but that could be generated consistent with real-world physical or geometrical constraints, or other constraints.

Virtual scene elements might comprise actors, characters, beings, objects, lighting, etc. that are to be depicted in a virtual scene or that can affect an appearance of a virtual scene. A virtual scene element might have metadata or parameters associated therewith that can be used in rendering the virtual scene, such as position and size of the virtual scene element in a virtual scene space coordinate system. Some virtual scene elements might be imagery captured previously from a real-world stage.

Rendering can be a process of generating an image, or a sequence of images generated according to a virtual scene. The sequence of images may form a timed sequence of images such as a video sequence. Rendered images can be stored in computer-readable memory.

A virtual focus model 226 can be represented by a data structure defining how focus should be applied to virtual scene elements, which can be a function of their positions in the virtual scene space coordinate system relative to the virtual camera viewpoint, as well as focus parameters of a lens of a physical or virtual camera (e.g., focus parameters 126 of lens 125, as shown for example in FIG. 1). A virtual focus model 226 might specify a depth of field, a focal point, a focal length, and/or bokeh effects for one or more virtual scene element that are to be applied to such virtual scene elements when rendering the virtual scene.

A virtual scene display might be a display device that can receive rendered images and display those rendered images. The virtual scene display could be an LED wall 102, and could be planar, curved, piecewise planar, or some other shape.

A combined real-world scene (e.g., combined real world scene 107 of FIG. 1) might be a real-world scene wherein at least one of the real-world scene elements is a virtual scene display displaying a rendered image of a virtual scene. In the example shown in FIG. 2, video wall 102 displays a first calibration image 210, comprising pixels generated on the video wall 102. The first calibration image falls within viewing frustum 130*a* of first real-world camera 120*a* and viewing frustum 130*b* of second real-world camera 120*b*, and so is visible to both cameras. A second calibration image 220 is also displayed on video wall 102, but is visible only to second real-world camera 120*b*. A calibration image 210 or 220 may for example include a test pattern, which may comprise lines, circles, polygons, or other shapes of varying size, line weights, colors, etc., or may comprise photographic images or other images. The calibration image may be stored in a memory and retrieved for image generation and display, or may be calculated at the time of display, based on real or desired focal parameters, or other considerations. A calibration image 210 or 220 may be used for example to adjust focus settings 126 of a lens 125 of a real-world camera 120*a* so that, for example, calibration image 210 or 220 appears in good focus when the focal depth of camera 120*a* or 120*b* is set to a depth similar to the distance between camera 120*a* or 120*b* and video wall 102 at the position of calibration image 210 or 220.

In an example, a camera (e.g., camera 120*a* or 120*b*) may capture a first image of the combined real world and virtual scene that includes a calibration image (e.g., calibration image 210 or 220), and may then adjust its focus or position before capturing a second image, also including the calibration image. A comparison between the first and second image may then be used to determine a direction and/or amount to adjust a position or focus property of the camera in order to achieve a desired level of focus. The desired level of focus may be a desired focus of the camera, a desired defocus or blur effect for the calibration image or a virtual object, or combinations thereof.

Figure 3:
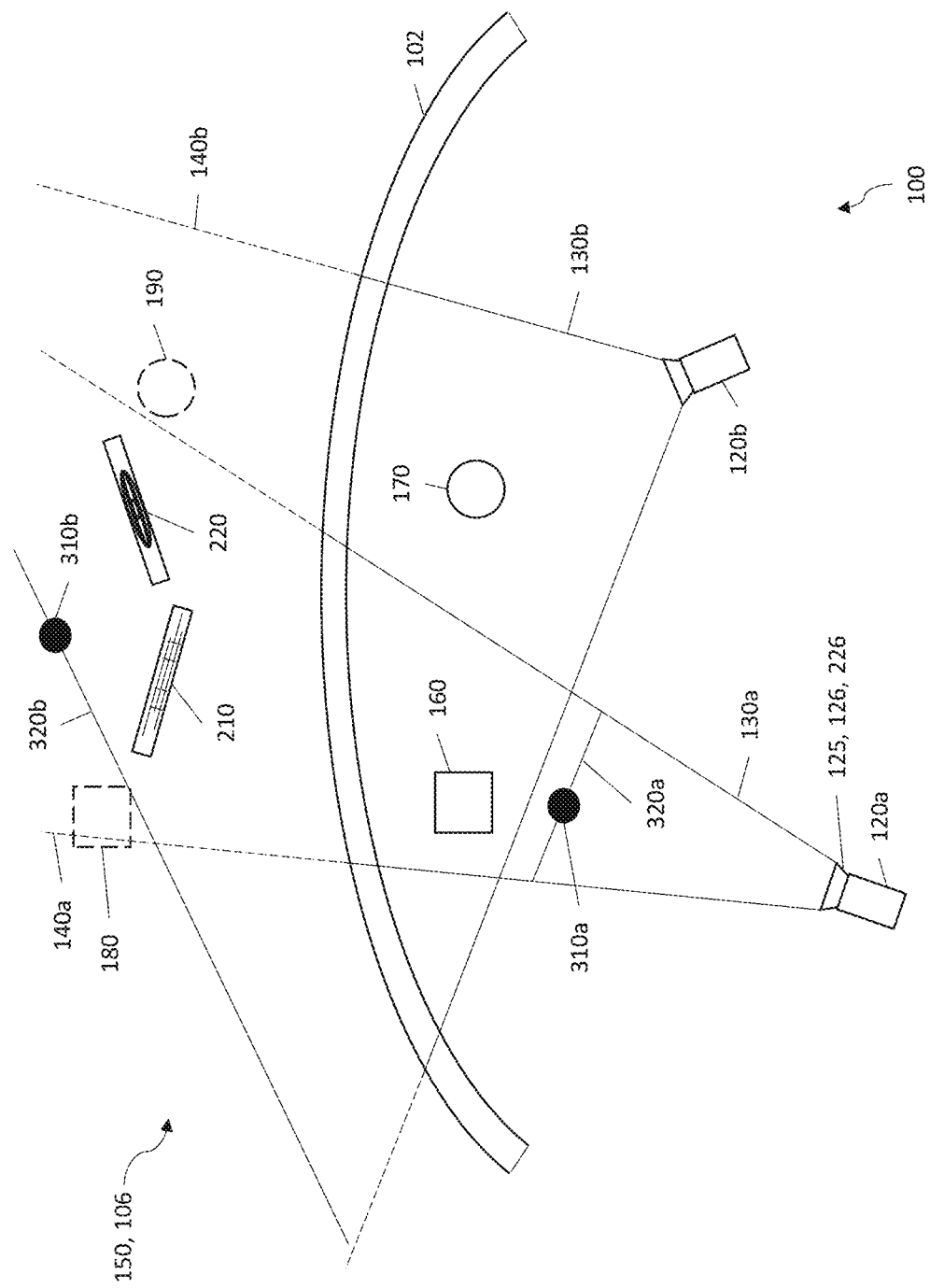
FIG. 3 illustrates an example real-world stage, which includes a display wall, behind which exists a virtual space comprising a virtual scene, in accordance with at least one implementation of the present disclosure.

FIG. 3 illustrates an example real-world stage 100, which includes a video wall 102, behind which exists a virtual space 150 comprising a virtual scene 106, in accordance with at least one implementation of the present disclosure. Visible are first physical object 160, second physical object 170, first virtual object 180, second virtual object 190, first camera 120*a*, second camera 120*b*, first viewing frustum 130*a*, second viewing frustum 130*b*, first virtual viewing frustum 140*a*, and second virtual viewing frustum 140*b*.

Also visible are first calibration image 210 and second calibration image 220. Unlike FIG. 2, where calibration images 210 and 220 are treated as 2D images on video wall 102, in the example of FIG. 3 calibration images 210 and 220 have been given positions and orientations within virtual space 150. This may be done for example to help an operator or algorithm adjust lens parameters 126 of a real-world camera and/or virtual focus model 226 of a virtual camera (e.g., a virtual camera placed at the same position and orientation as the corresponding real-world camera) to a desired focus level for different objects at different depths.

In this example, lens parameters 126 of first camera 120*a* are such that first camera 120 has a focal point 310*a* or focal plane 320*b* positioned in front of physical object 160. This may be done for example so that physical object 160 is in good focus. However, in this situation, it may not be realistic for virtual object 180 to also be in good focus. For example, if lens parameters 126 indicate that a physical object at the same depth as virtual object 180 (e.g., depth D4 as shown in FIG. 1) would be out of focus to a particular degree, then it may be desirable to render virtual object 180 out of focus to that same degree. However, because virtual object 180 actually exists as pixels on the surface of video wall 102, the real-world focus level of virtual object 180 will in fact be based on the depth between the first camera 120a and the video wall (e.g., depth $D4_{real}$). Therefore, to defocus virtual object 180 to a realistic degree, it is desirable to create a virtual camera at the same position as camera 120a, with a virtual focus model 226 based on lens 125 and lens settings 126 of camera 120a. The renderer can then render virtual object 180 out of focus, to a degree proportional to its depth. In some implementations, the renderer may render virtual object 180 in focus, but its focus level or blur factor may be adjusted based on depth in real time or near-real time by a blurring algorithm, as described for example in U.S. patent application Ser. No. 17/086,032, filed Oct. 30, 2020, hereby incorporated in its entirety as though fully set forth herein. It should be noted that defocus may include bokeh, vignette, or lemmoning effects.

This real-time or near-real-time defocusing or defocus adjustment may be particularly useful in instances where either the position, orientation, or focus parameters of camera 120a may change over time as the scene is filmed. In some implementations, the system may include a feedback loop or the like (e.g., monitoring an encoder on the camera lens), to ensure that gradual changes in the real blur and the virtual blur are at least approximately synchronized, so there is no "pop" or sudden focus change during a transition. Virtual focus model 226 may then for example be "slaved" to real focus parameters 126, such that the virtual camera "sees" virtual objects exactly as a real camera would see real objects at an equivalent depth, even while the position or focal parameters of the camera are changing. In the example shown in FIG. 3, calibration image 210 has been placed in the virtual space 150, proximate to virtual object 180, to aid in the defocusing procedure. This may be done for example if calibration image 210 is more recognizable than virtual object 180, or if calibration image 210 includes particular features indicative of a focus level of the calibration image 210.

The virtual space 150 also includes a second calibration image 220, whose position and orientation are selected to aid in the calibration of lens parameters of camera 120b, and a corresponding virtual focus model of a virtual camera placed at approximately the same position and orientation as the second camera 120b. In this example, camera 120b has a focal point 310b or focal plane 320b that is proximate to virtual object 180. This may be done for example such that virtual object 180 is in sharp focus, whereas virtual object 190 is in softer focus (e.g., to de-emphasize its importance in the mind of a viewer), while physical objects 160 and 170 are strongly out of focus (e.g., to make them appear as part of the foreground).

In this example, calibration image 220 may be placed proximate to virtual object 180 or virtual object 190, and may assist in the defocus process, whether manual or automated, by providing a reference as to the focus level at the depth where the calibration image 220 is positioned. For example, if calibration image 220 is placed within focal plane 320b, then the focus parameters and virtual focus model may be adjusted until calibration image 220 appears in sharp focus. Alternatively, the calibration image may be placed proximate to virtual object 190, and the focus parameters and virtual focus model adjusted until calibration image 220 is in a desirable state of soft focus, or any other desired focus state.

It should be noted that depending on the camera type, lens type, lens settings or parameters, or other variables, the camera may have a focal point, a focal plane, a focal region that is a spherical or parabolic section, or other focal geometry. In some cases, focal parameters of one or more cameras may be measured or adjusted based at least in part on images taken of one or more calibration images. In some cases, two or more cameras may be configured to generate stereoscopic images (e.g., for 3D video). In some cases, two identical or nearly identical calibration images may be placed proximate to one another at a given depth, for calibration of a stereo imaging process. In some cases, a calibration image may include 3D features, or 2D features at multiple depths or plane orientations, to facilitate calibration of one or more cameras in three dimensions. In some cases, a calibration image may be adjusted dynamically (e.g., moved, rotated, expanded, contracted, distorted, focused, or defocused) while a camera is moved, or while one or more focal settings of the camera are adjusted. In some cases, a calibration image may be an animation.

In some aspects, one or more calibration steps may be employed to mimic or emulate the effect of a particular camera lens (e.g., a trick lens), such that shooting of the scene may take place with a wide or infinite depth of field, while the lens effects are reproduced on the display wall 102 using a virtual lens model and virtual camera that mimic the desired lens. In some cases, such lenses may behave differently at their edges than near their centers, and the calibration process may thus need to include calibrating the edges of a viewing frustum as well as its center.

Figure 4:
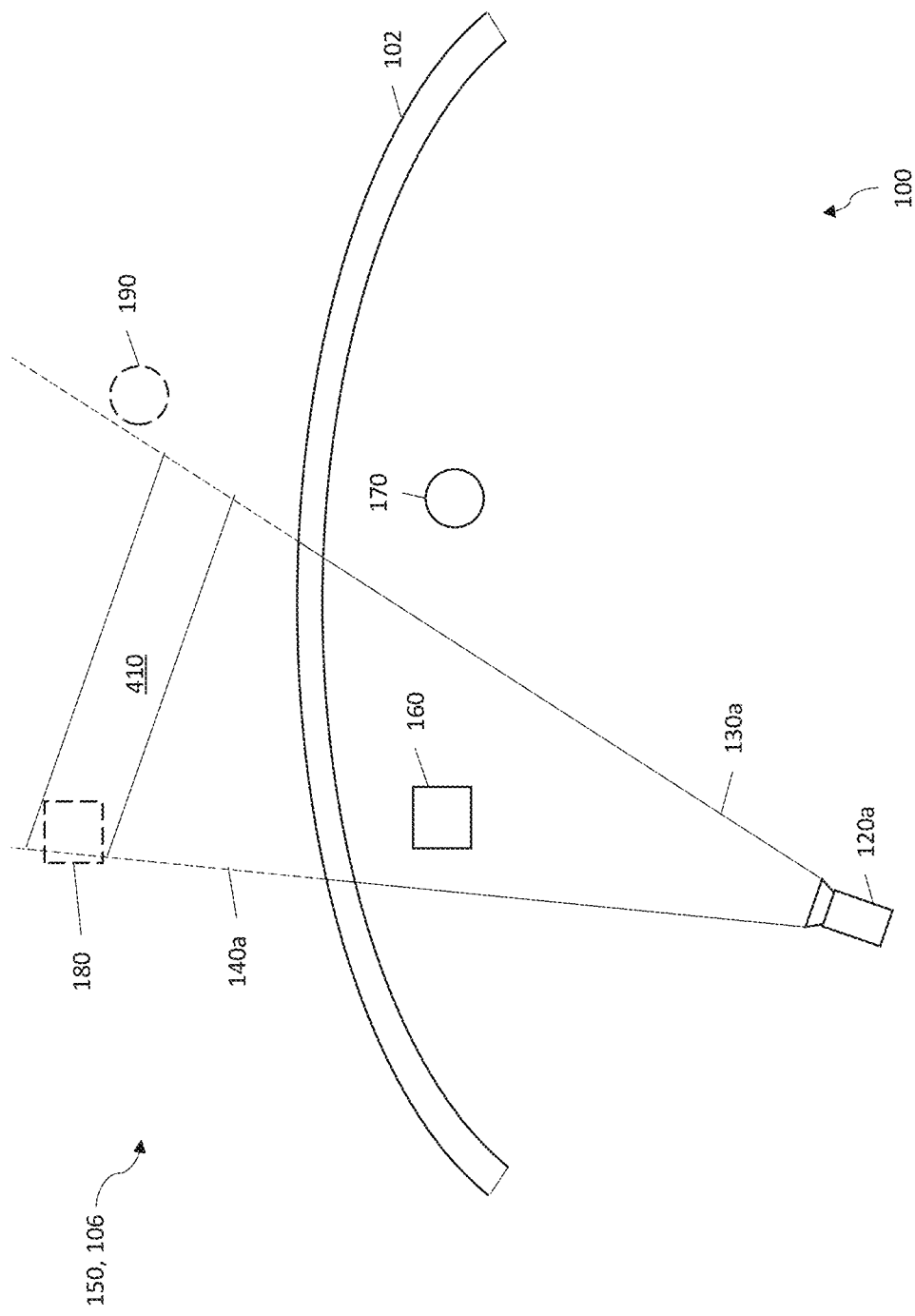
FIG. 4 illustrates an example real-world stage, which includes a display wall, behind which exists a virtual space comprising a virtual scene, in accordance with at least one implementation of the present disclosure.

FIG. 4 illustrates an example real-world stage 100, which includes a video wall 102, behind which exists a virtual space 150 comprising a virtual scene 106, in accordance with at least one implementation of the present disclosure. Visible are first physical object 160, second physical object 170, first virtual object 180, second virtual object 190, first camera 120a, first viewing frustum 130a, and first virtual viewing frustum 140a.

In some implementations, rather than calculating an exact depth between a camera and a virtual object, it may be desirable to divide virtual space 150 or virtual scene 106 into depth slices or viewing slices, and rendering all objects within a given slice at the same blur factor (e.g., the same level of blur or defocus). Such an approach may, for example, require less computation than the procedures described above, while providing visually similar results. In the example shown in FIG. 4, a single depth slice or viewing slice 410 is shown, which contains virtual object 180. Depending on the implementation, any number of depth slices may be used, from two (e.g., a foreground slice and a background slice), to several hundred (such that, for example, different portions of the same object may be at different focus levels).

Figure 5:
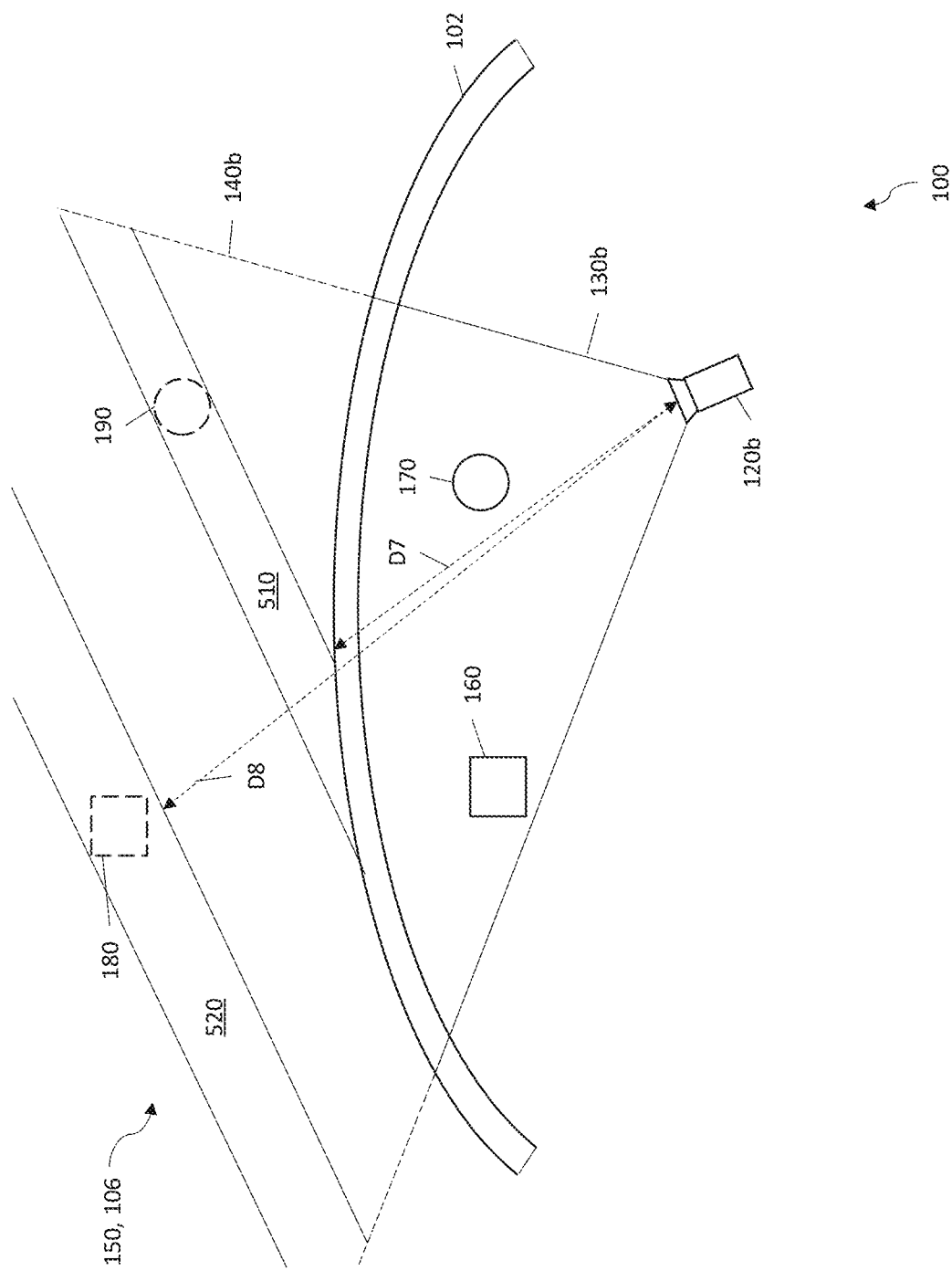
FIG. 5 illustrates an example real-world stage, which includes a display wall, behind which exists a virtual space comprising a virtual scene, in accordance with at least one implementation of the present disclosure.

FIG. 5 illustrates an example real-world stage 100, which includes a video wall 102, behind which exists a virtual space 150 comprising a virtual scene 106, in accordance with at least one implementation of the present disclosure. Visible are first physical object 160, second physical object 170, first virtual object 180, second virtual object 190, second camera 120b, second viewing frustum 130b, and second virtual viewing frustum 140b.

In the example shown in FIG. 5, two portions of virtual scene 106 have been identified as depth slices or viewing slices. Viewing slice 510, at a first depth D7 from the camera 120b, contains virtual object 190, whereas viewing slice 520, at a second, further depth D8 from camera 120b, contains virtual object 180. Such non-contiguous (e.g., spaced-apart) viewing slices may be employed if, for example, there are no intervening objects at depths larger than D7 and smaller than D8, or for other reasons (e.g., artistic preference or limited computing power). However, in other cases depth slices or viewing slices may be contiguous. depth slices may be planar, may be spherical sections, or may be other shapes as appropriate to the lens characteristics of the camera. They may be contiguous or spaced apart, and may be same shape or thickness or may be different shapes or thicknesses.

Figure 6:
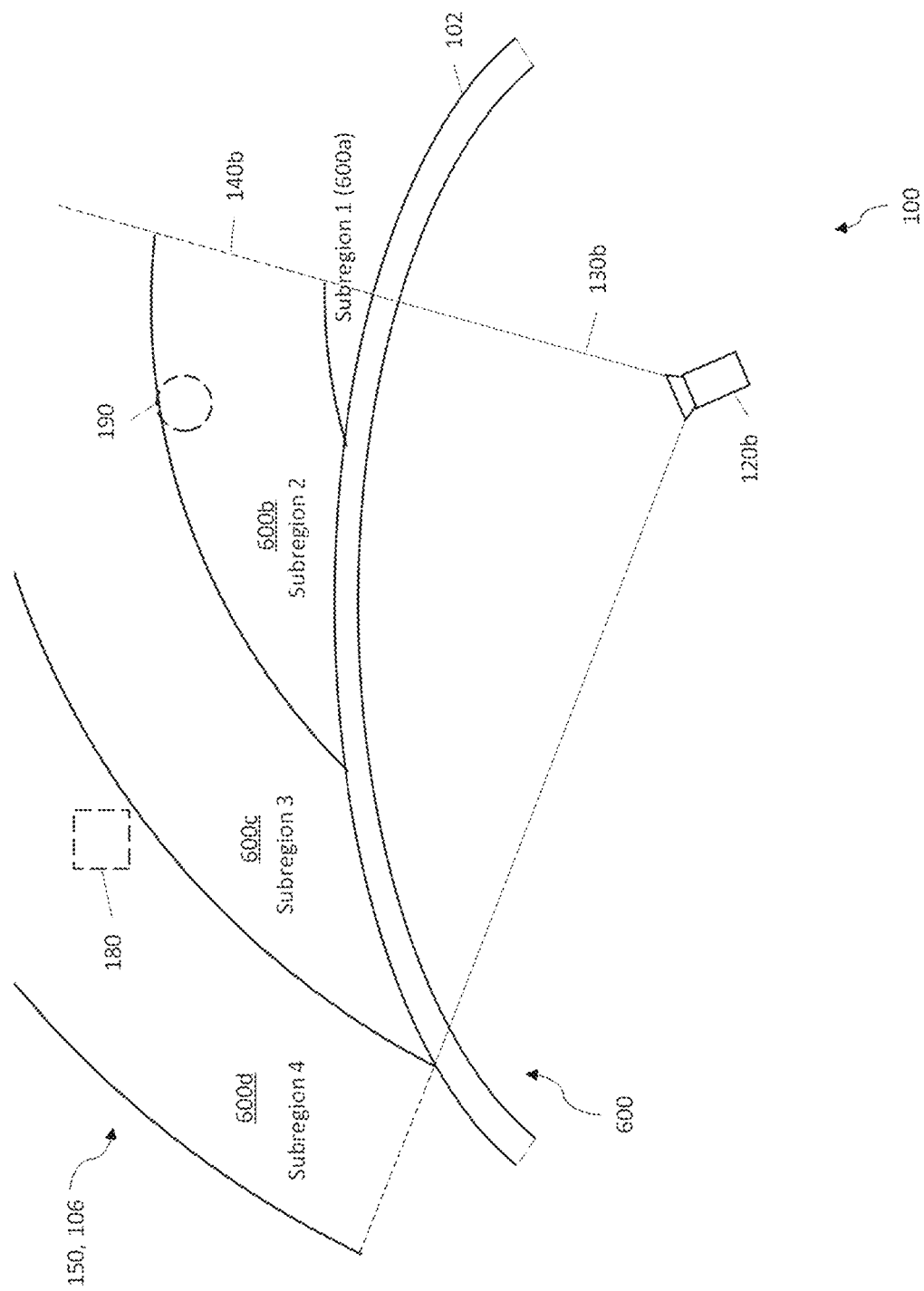
FIG. 6 illustrates an example real-world stage, which includes a display wall, behind which exists a virtual space comprising a virtual scene, in accordance with at least one implementation of the present disclosure.

FIG. 6 illustrates an example real-world stage 100, which includes a video wall 102, behind which exists a virtual space 150 comprising a virtual scene 106, in accordance with at least one implementation of the present disclosure. Visible are first physical object 160, second physical object 170, first virtual object 180, second virtual object 190, second camera 120b, second viewing frustum 130b, and second virtual viewing frustum 140b. In the example shown in FIG. 6, virtual scene 106 has been divided into a plurality of subregions 600. Subregions 600a-600d may be depth slices or viewing slices as described above, and as shown in FIG. 6, but are not limited to such configurations. Rather, virtual scene 106 may be divided into grid squares, hexagons, irregular shapes, or tesselating or quasicrystalline patterns of shapes, with each square, hexagon, or other subregion having a defined depth and corresponding level of blur. In some implementations, all virtual scene elements within a given subregion may be assigned the same blur level or blur effect, which may yield a visually convincing result, while requiring less computation than determining separate defocus parameters for each individual virtual object or scene element.

Figure 7:
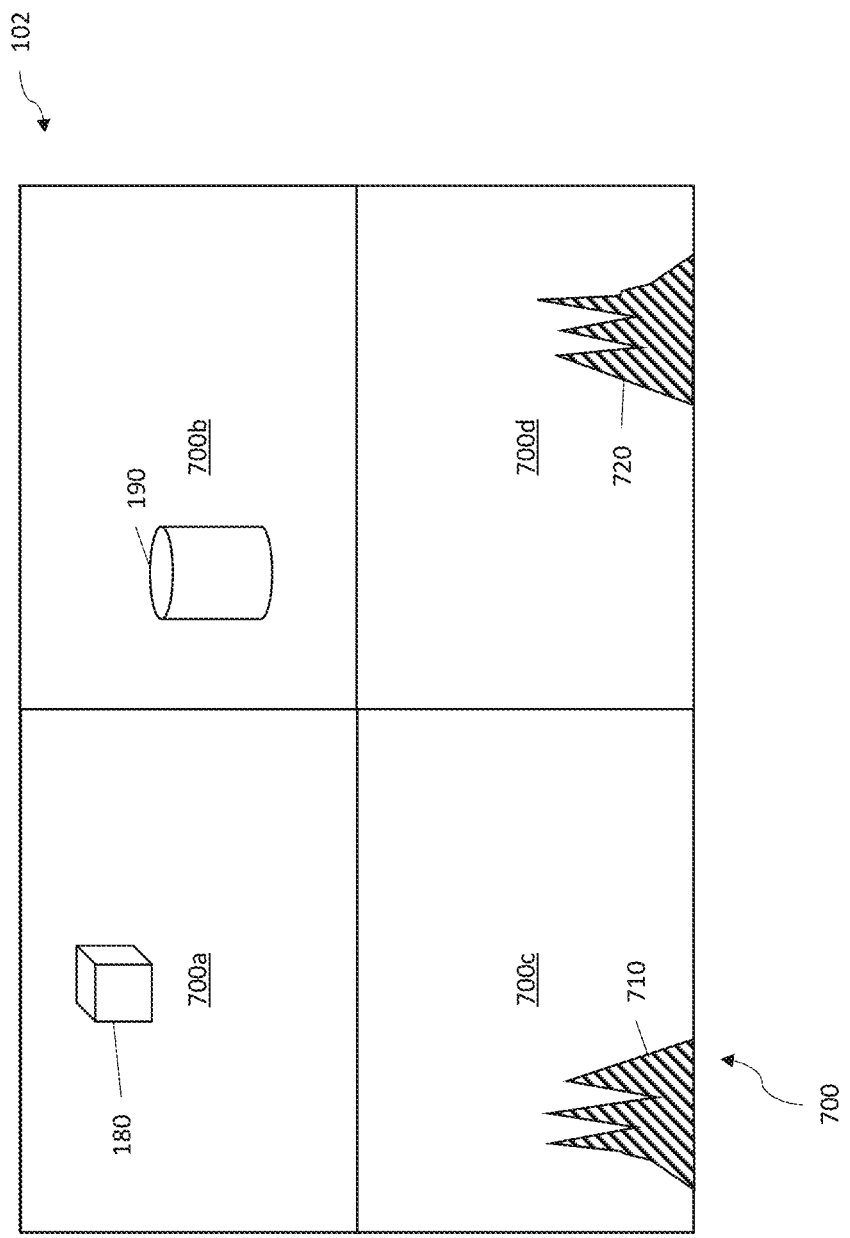
FIG. 7 illustrates an example video wall divided into a plurality of subregions, in accordance with at least one implementation of the present disclosure.

FIG. 7 illustrates an example video wall 102 divided into a plurality of subregions 700, in accordance with at least one implementation of the present disclosure. In some implementations, the virtual scene may be divided into subregions based on display location on video wall 102 itself (as shown in FIG. 7), rather than location within the virtual space or virtual scene (as shown for example in FIG. 6). In the example shown in FIG. 7, video wall 102 is divided into four subregions 700a-700d, each of which may for example comprise pixels (e.g., an N×N pixel array or single pixel). This may be done for example if virtual objects or scene elements (e.g., virtual objects 180 and 190) whose images appear near the top of the video wall 102 are located at a greater range than virtual objects or scene elements (e.g., scene elements 710 and 720) whose images appear near the bottom of video wall 102. In such a case, it may be desirable to apply one level of blur or defocus to subregions 700a and 700b, and a different level of blur or defocus to subregions 700c and 700d. In other cases, depending on the range or depth to each virtual object or scene element, it may be desirable to apply a unique level of blur or defocus to each subregion 700.

The arrangement shown in FIG. 7 should be considered exemplary rather than limiting, as other arrangements may be used instead or in addition. For example, there may be more or fewer subregions. Subregions may be of any size or shape, and may be the same as one another or different from one another. Subregions may be contiguous or non-contiguous.

Figure 8:
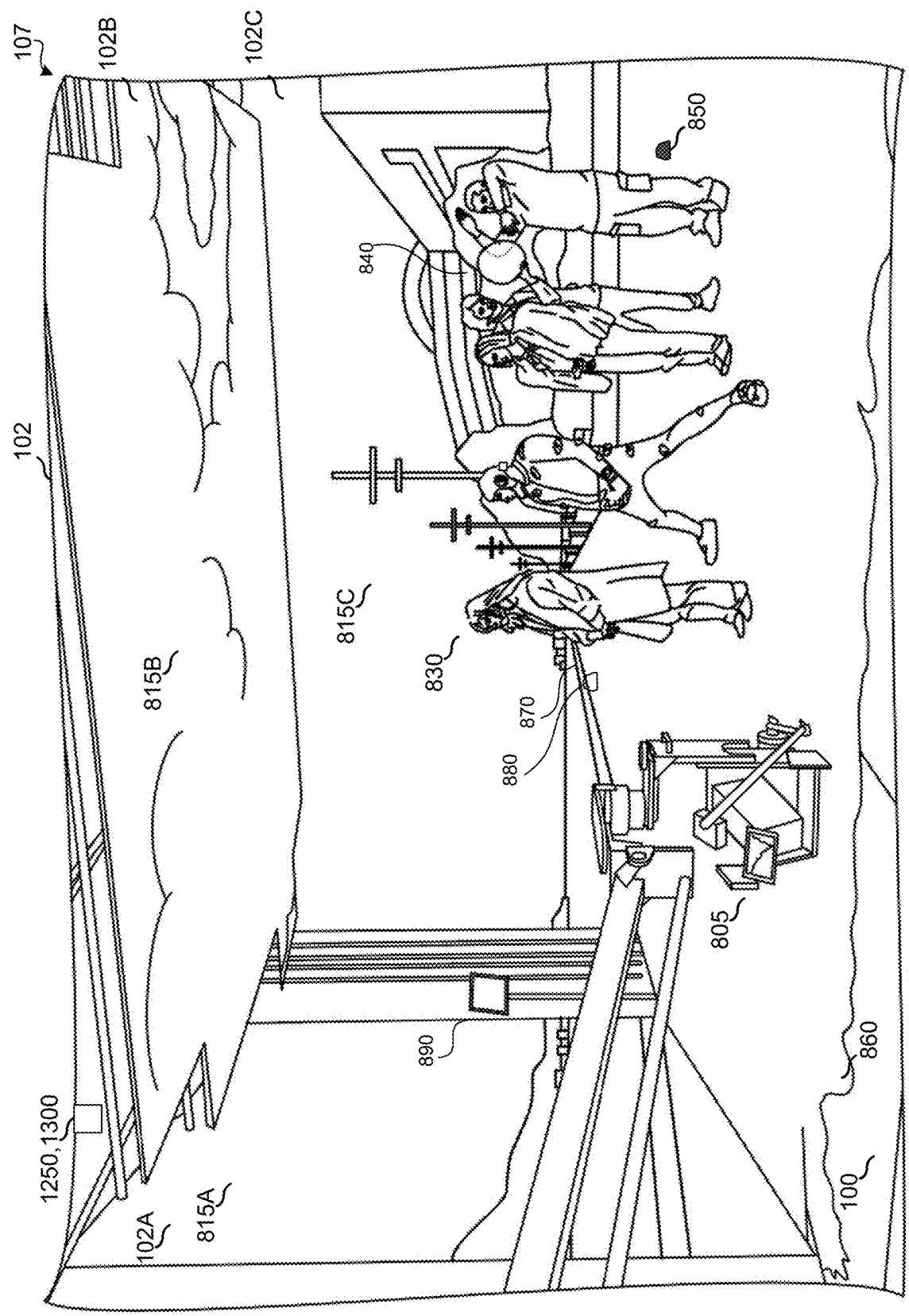
FIG. 8 shows a virtual production set, in accordance with at least one implementation of the present disclosure.

FIG. 8 shows a virtual production set 107, in accordance with at least one implementation of the present disclosure. The virtual production set 107 includes a virtual production display or display wall 102 which can surround a stage 100. The display wall 102 can include multiple screens 102A, 102B, 102C. One or more of the screens 102A, 102B, 102C can be curved. The size of each screen 102A, 102B, 102C can correspond to a size of a wall and exceed 6 feet in height and 3 feet in width. The stage 100 may be sufficiently large to include multiple actors 830 and props 840, 850, 860. The stage 100 can integrate with the screens 102A, 102B, 102C presenting images 815A, 815B, 815C, respectively. For example, the stage 100 can include props, such as rocks 850 and sand 860, that mimic the appearance of rocks 870 and sand 880 that appear as images on the display wall 102. The display wall 102 illuminates the stage 100, actors 830, and props 840, 850, 860. Thus, the lighting of the real and virtual environments can match the lighting of the actors 830 and props 840, 850, 860. In particular, highly reflective surfaces, such as metallic surfaces, can properly reflect both the real and virtual environments. In addition to the illumination from display wall 102, additional lights 890 can illuminate the stage 100.

The display wall 102 needs to update the images 815A, 815B, 815C to reflect events on the stage 100 such as motion of the actors 830, parallax to correctly create a sense of depth, interaction between the actors 830 and the images 815A-815C, etc. In other words, the display wall 102 may to render in real time. A rendering engine 1250, such as Unreal Engine or Gazebo, running on a processor 1300 can render the images 815A-815C in real time in response to events on the stage 100. The rendering engine 1250 can communicate with a camera 805 using a wired or a wireless network. The camera 805 can record the stage 1000 including images presented on the display wall 102, actors 830, and props 840, 850, 860. The camera 805 and the processor 1035 may communicate wirelessly, such that the rendering engine 825 can track camera movement and/or changes in camera focus.

Figure 9:
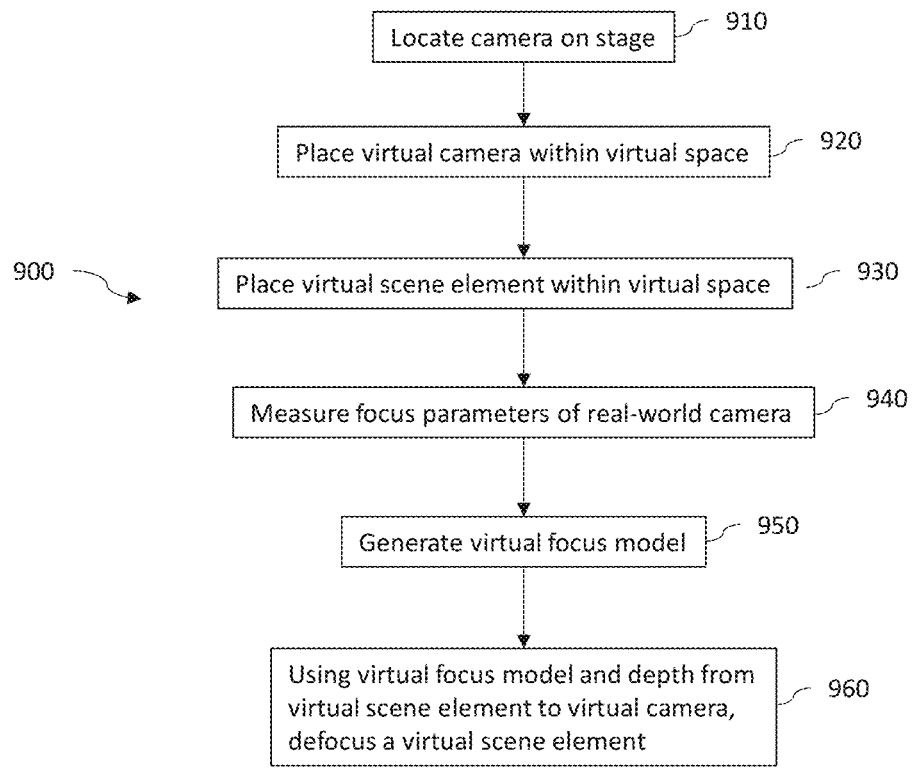
FIG. 9 is a flowchart of an exemplary method as might be performed by an image processor to defocus a sharp rendered image, in accordance with at least one implementation of the present disclosure.

FIG. 9 is a flowchart of an exemplary method 900 as might be performed by an image processor to defocus a sharp rendered image, in accordance with at least one implementation of the present disclosure. Note that one or more of the steps of method 900 may be combined, omitted, or performed in a different order in different implementations.

In step 910, the method includes locating the position and orientation of a real-world camera on the real-world stage. Position and orientation sensors of various types may be used for this step (whether on the camera, on the video wall, or elsewhere on the stage), or the position and orientation may be estimated, or may be manually entered or automatically read from, e.g., markings on the floor, etc. In some implementations, this step also includes locating the video wall on the stage.

In step 920, the method includes placing a virtual camera within a virtual space, where the position and orientation of the virtual camera are at least approximately the same as the position and orientation of the real-world camera on the real-world stage.

In step 930, the method includes placing a virtual scene element in the virtual space. In most cases, the virtual scene element will be located "behind" the video wall and within a viewing frustum of the virtual camera. However, in some cases, virtual scene elements (e.g., light sources, shadow sources, reflectors, etc.) that are not visible to the virtual camera may also be placed, if they are believed to affect the visual appearance of virtual scene elements that are within view of the virtual camera, or of real-world scene elements located on the real-world stage and within the view of the real-world camera. In some implementations, rendering of the virtual scene takes place at this step, along with display of the virtual scene on the video wall.

In step 940, the method includes obtaining, from the real-world camera, an indication of a lens function, wherein a lens function represents a lens shape (e.g., circular, hexagonal, or a different shape) and/or a lens effect (e.g., chromatic aberration, warping, fisheye, etc.). The lens shape may correspond to an aperture shape in a physical camera lens (e.g., the lens which would produce the defocus effect the image processor is emulating). Other lens parameters may also be obtained, including zoom level, depth of field, a focal point, a focal length, aberration, and/or bokeh, vignette, or lemmoning effects.

In step 950, the method includes generating a virtual focus model for the virtual camera. In some implementations, the virtual focus model may for example include at least an approximation of at least some of the parameters of the lens function of step 740. The virtual focus model may for example account for the position of the video wall, such that the real and virtual components of the range to the virtual scene element can be determined. In an example, defocus due to the real component of the range does not need to be simulated or otherwise accounted for, as it is physically determined by the actual focus of the physical camera lens. Thus, the adjusted focus (e.g., blur or defocus effects) may only need to be added to the virtual scene element according to the virtual component of the range.

In other implementations, the virtual focus model may be simpler than the lens(es) of the real-world camera, if only approximate adjusted focus or defocusing effects are desired.

In step 960, the method includes determining an adjusted focus (e.g., defocus or blurring effect) for the virtual object, based on the virtual focus model and a range or depth (e.g., relative position or distance) between the virtual camera and the virtual scene element, or between the video wall and the virtual scene element. In some implementations, this defocus or blurring effect is applied post-rendering, e.g., applied to the virtual scene element within a rendered image of the virtual scene. In other implementations, rendering of the virtual scene occurs at this step and includes the adjusted focus, defocus, or blurring effect. In either case, the rendered image with the adjusted focus is displayed on the video wall, where it can serve as a smart, defocusable backdrop for the real-world stage.

Figure 10:
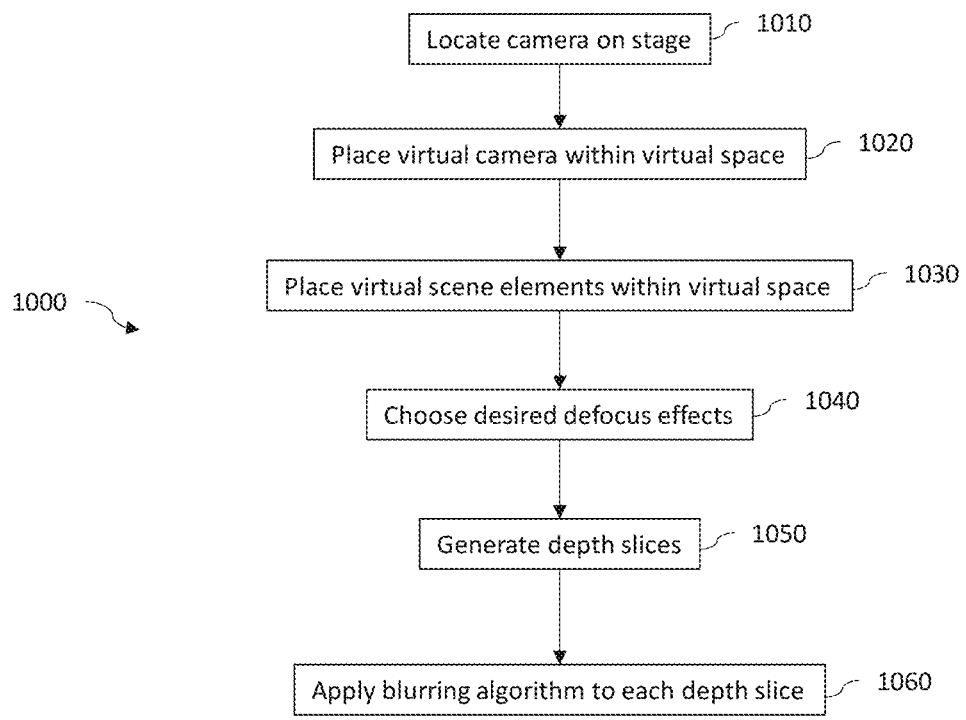
FIG. 10 is a flowchart of an exemplary method as might be performed by an image processor to defocus a sharp rendered image, in accordance with at least one implementation of the present disclosure.

FIG. 10 is a flowchart of an exemplary method 1000 as might be performed by an image processor to defocus a sharp rendered image, in accordance with at least one implementation of the present disclosure. Note that one or more of the steps of method 1000 may be combined, omitted, or performed in a different order in different implementations.

In step 1010, the method includes locating the position and orientation of a real-world camera on the real-world stage. Position and orientation sensors of various types may be used for this step (whether onboard the camera or elsewhere on the stage), or the position and orientation may be estimated, or may be manually entered or automatically read from, e.g., markings on the floor, etc.

In step 1020, the method includes placing a virtual camera within a virtual space, where the position and orientation of the virtual camera are at least approximately the same as the position and orientation of the real-world camera on the real-world stage.

In step 1030, the method includes placing one or more virtual scene elements in the virtual space. In most cases, the virtual scene elements will be located "behind" the video wall and within a viewing frustum of the virtual camera. However, in some cases, virtual scene elements (e.g., light sources, shadow sources, reflectors, etc.) that are not visible to the virtual camera may also be placed, if they are believed to affect the visual appearance of virtual scene elements that are within view of the virtual camera, or the appearance of real-world scene elements located on the real-world stage and within the view of the real-world camera (e.g., by casting light, reflection, or shadow). In some implementations, rendering of the virtual scene takes place at this step, along with display of the virtual scene on the video wall.

In step 1040, the method includes choosing desired defocus effects. This may involve, for example, all objects within a certain range of depths being assigned a first adjusted focus (e.g., blur or defocus level, whether calculated or artistically chosen), all objects within a second range of depths being assigned a second adjusted focus, etc.

In step 1050, the method includes dividing the virtual scene into depth slices or other subregions. In some cases, depth slices or other subregions may be generated automatically, based on geometry. In other cases, depth slices or other subregions may be selected specifically to include certain virtual scene elements and exclude certain other virtual scene elements.

In step 1060, the method includes applying the adjusted focus, defocus, or blurring effect to the virtual objects, based on which depth slice or subregion they are located in. In some implementations, this adjusted focus is applied to the virtual scene elements within a rendered image of the virtual scene. In other implementations, rendering of the virtual scene occurs at this step and includes the adjusted focus, defocus, or blurring effect. In either case, the rendered image with the adjusted focus or blurring effects is displayed on the video wall, where it can serve as a smart, defocusable backdrop for the real-world stage.

FIG. 11 illustrates an example of defocusing a virtual object, in accordance with at least one implementation of the present disclosure. Such blurring may for example involve creation of a blur transparency map 1110 for a portion of a rendered image 1100. Here, a box 1106 is positioned behind a smaller box 1104, and in front of a background 1108. In an example, box 1106 is to be defocused, in a realistic way that includes information about what is behind the edges of box 1106. Image portion 1100 may not include color information for the portion of box 1106 obscured by box 1104, nor of the portion of background 1108 obscured by box 1106. Defocusing box 1106 may introduce unwanted transparency (also referred to as artifacts) to pixels. The artifacts should be corrected, while leaving other pixels with intentional transparency untouched. An image processor may create a blur transparency map 1110 to protect intentionally transparent pixels of image portion 1100, while correcting artifacts of the defocusing process, as described for example in U.S. patent application Ser. No. 17/086,032, filed Oct. 30, 2020, hereby incorporated in its entirety as though fully set forth herein.

The image processor may first perform edge detection and produce a modified image or blur transparency map 1110 that includes raw alpha channel output from image 1100 during the defocusing process. The dark areas of image 1110 represent pixels that include transparency, both intentionally (e.g., as a result of softening the edges of box 1106) and as an unintended result of the defocusing process, with darker areas corresponding to a higher degree of transparency than less dark areas. For example, the dark area outside of region 1106 may be the intentional result of the defocusing process and should not be corrected. The dark area around region 1104, however, may be an unintended artifact introduced during the defocusing process that should be corrected. For example, while defocusing box 1106, unintentional transparency may have been introduced around box 1104 because of missing color information caused by box 1104 obscuring box 1106. The image processor may create a mask 1114 (represented here as a region filled with diagonal lines) to designate areas of the image portion 1100 that may contain artifacts that should be corrected, resulting in blur transparency map 1110. When the image processor blends color values for pixels, it will exclude pixels outside the mask 1114. The result of defocusing box 1106 is illustrated in a selectively defocused image 1120. As illustrated in selectively defocused image 1120, the transparent area around box 1104 introduced as part of defocusing box 306 has been removed, but the transparent area along the outside of box 1106 (giving box 1106 a softened appearance) has been preserved.

Figure 12:
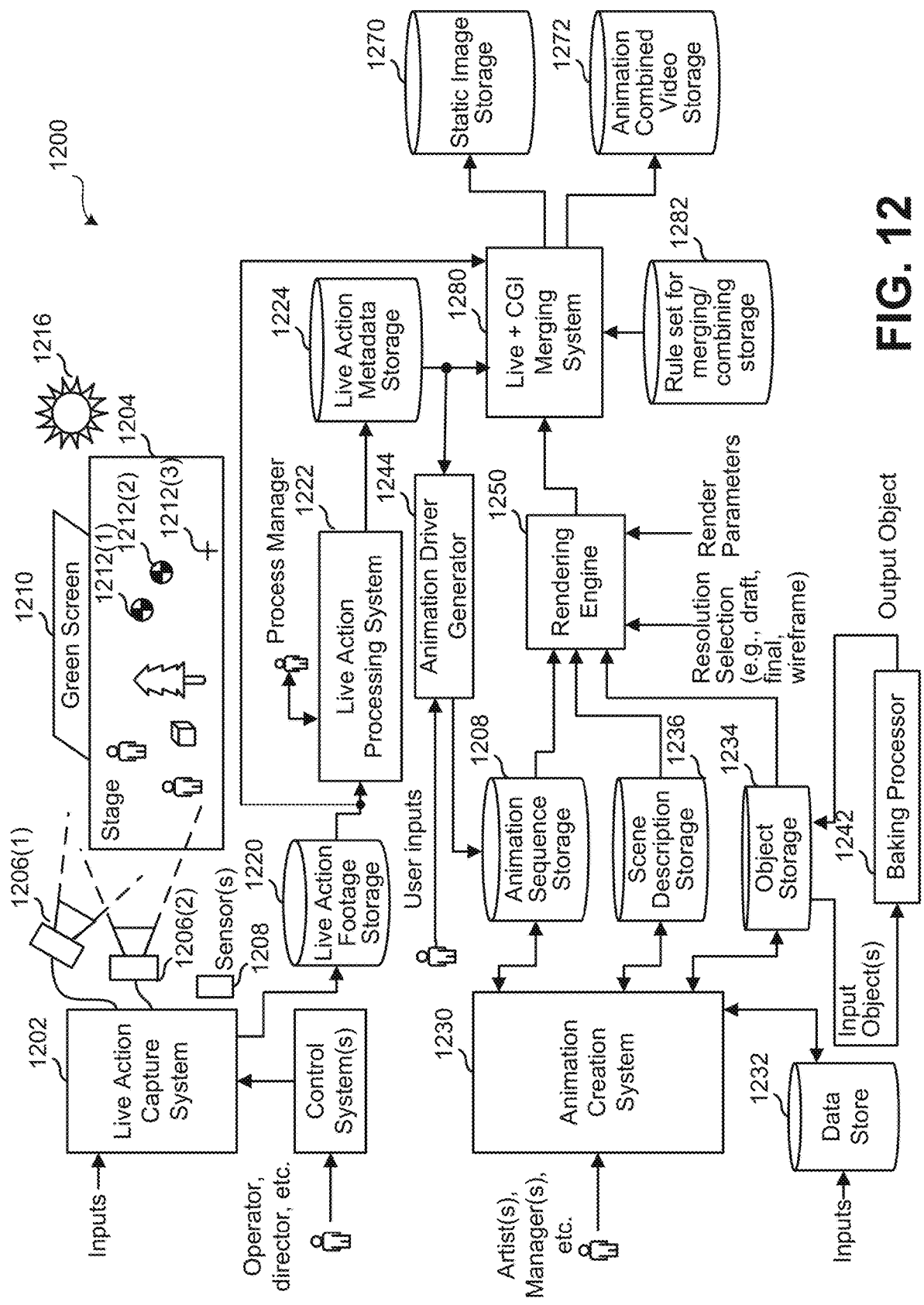
FIG. 12 illustrates an example visual content generation system as might be used to generate imagery in the form of still images and/or video sequences of images, in accordance with at least one implementation of the present disclosure.

FIG. 12 illustrates an example visual content generation system 1200 as might be used to generate imagery in the form of still images and/or video sequences of images, in accordance with at least one implementation of the present disclosure. Visual content generation system 1200 might generate imagery of live action scenes, computer generated scenes, or a combination thereof. In a practical system, users are provided with tools that allow them to specify, at high levels and low levels where necessary, what is to go into that imagery. For example, a user might be an animation artist and might use visual content generation system 1200 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 1200 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1220-pixel columns by 1280-pixel rows or 4096-pixel columns by 2160-pixel rows, or some other resolution. Images might or might not be stored in a compressed format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other implementations, pixel values are data structures and a pixel value is associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some implementations, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 12, a live action capture system 1202 captures a live scene that plays out on a stage 1204. Live action capture system 1202 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1206(1) and 1206(2) capture the scene, while in some systems, there might be other sensor(s) 1208 that capture information from the live scene (e.g., infrared cameras, infrared sensors, motion capture ("mo-cap") detectors, etc.). On stage 1204, there might be human actors, animal actors, inanimate objects, background objects, and possibly an object such as a green screen 1210 that is designed to be captured in a live scene recording in such a way that it is easily overlaid with computer-generated imagery. Stage 1204 might also contain objects that serve as fiducials, such as fiducials 1212(1)-(3), that might be used post-capture to determine where an object was during capture. A live action scene might be illuminated by one or more lights, such as an overhead light 1214.

During or following the capture of a live action scene, live action capture system 1202 might output live action footage to a live action footage storage 1220. A live action processing system 1222 might process live action footage to generate data about that live action footage and store that data into a live action metadata storage 1224. Live action processing system 1222 might include computer processing capabilities, image processing capabilities, one or more processors, program code storage for storing program instructions executable by the one or more processors, as well as user input devices and user output devices, not all of which are shown. Live action processing system 1222 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 1214, as that might be useful in post-processing to match computer-generated lighting on objects that are computer-generated and overlaid on the live action footage. Live action processing system 1222 might operate autonomously, perhaps based on predetermined program instructions, to generate and output the live action metadata upon receiving and inputting the live action footage. The live action footage can be camera-captured data as well as data from other sensors.

An animation creation system 1230 is another part of visual content generation system 1200. Animation creation system 1230 might include computer processing capabilities, image processing capabilities, one or more processors, program code storage for storing program instructions executable by the one or more processors, as well as user input devices and user output devices, not all of which are shown. Animation creation system 1230 might be used by animation artists, managers, and others to specify details, perhaps programmatically and/or interactively, of imagery to be generated. From user input and data from a database or other data source, indicated as a data store 1232, animation creation system 1230 might generate and output data representing objects (e.g., a horse, a human, a ball, a teapot, a cloud, a light source, a texture, etc.) to an object storage 1234, generate and output data representing a scene into a scene description storage 1236, and/or generate and output data representing animation sequences to an animation sequence storage 1238.

Scene data might indicate locations of objects and other visual elements, values of their parameters, lighting, camera location, camera view plane, and other details that a rendering engine 1250 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 1230 might be interactive, allowing a user to read in animation sequences, scene descriptions, object details, etc. and edit those, possibly returning them to storage to update or replace existing data. As an example, an operator might read in objects from object storage into a baking processor 1242 that would transform those objects into simpler forms and return those to object storage 1234 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 1232 might be used to drive object presentation. For example, if an artist is creating an animation of a spaceship passing over the surface of the Earth, instead of manually drawing or specifying a coastline, the artist might specify that animation creation system 1230 is to read data from data store 1232 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1244 might read in live action metadata, such as data representing movements and positions of body parts of a live actor during a live action scene. Animation driver generator 1244 might generate corresponding animation parameters to be stored in animation sequence storage 1238 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 1222. Animation driver generator 1244 might convert that movement data into specifications of how joints of an articulated CGI character are to move over time.

A rendering engine 1250 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 1250 might include computer processing capabilities, image processing capabilities, one or more processors, program code storage for storing program instructions executable by the one or more processors, as well as user input devices and user output devices, not all of which are shown.

Visual content generation system 1200 can also include a merging system 1260 that merges live footage with animated content. The live footage might be obtained and input by reading from live action footage storage 1220 to obtain live action footage, by reading from live action metadata storage 1224 to obtain details such as presumed segmentation in captured images segmenting objects in a live action scene from their background (perhaps aided by the fact that green screen 1210 was part of the live action scene), and by obtaining CGI imagery from rendering engine 1250.

A merging system 1260 might also read data from rulesets for merging/combining storage 1262. A very simple example of a rule in a ruleset might be "obtain a full image including a two-dimensional pixel array from live footage, obtain a full image including a two-dimensional pixel array from rendering engine 1250, and output an image where each pixel is a corresponding pixel from rendering engine 1250 when the corresponding pixel in the live footage is a specific color of green, otherwise output a pixel value from the corresponding pixel in the live footage."

Merging system 1260 might include computer processing capabilities, image processing capabilities, one or more processors, program code storage for storing program instructions executable by the one or more processors, as well as user input devices and user output devices, not all of which are shown. Merging system 1260 might operate autonomously, following programming instructions, or might have a user interface or programmatic interface over which an operator can control a merging process. In some implementations, an operator can specify parameter values to use in a merging process and/or might specify specific tweaks to be made to an output of merging system 1260, such as modifying boundaries of segmented objects, inserting blurs to smooth out imperfections, or adding other effects. Based on its inputs, merging system 1260 can output an image to be stored in a static image storage 1270 and/or a sequence of images in the form of video to be stored in an animated/combined video storage 1272.

Thus, as described, visual content generation system 1200 can be used to generate video that combines live action with computer-generated animation using various components and tools, some of which are described in more detail herein. While visual content generation system 1200 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one implementation, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 13:
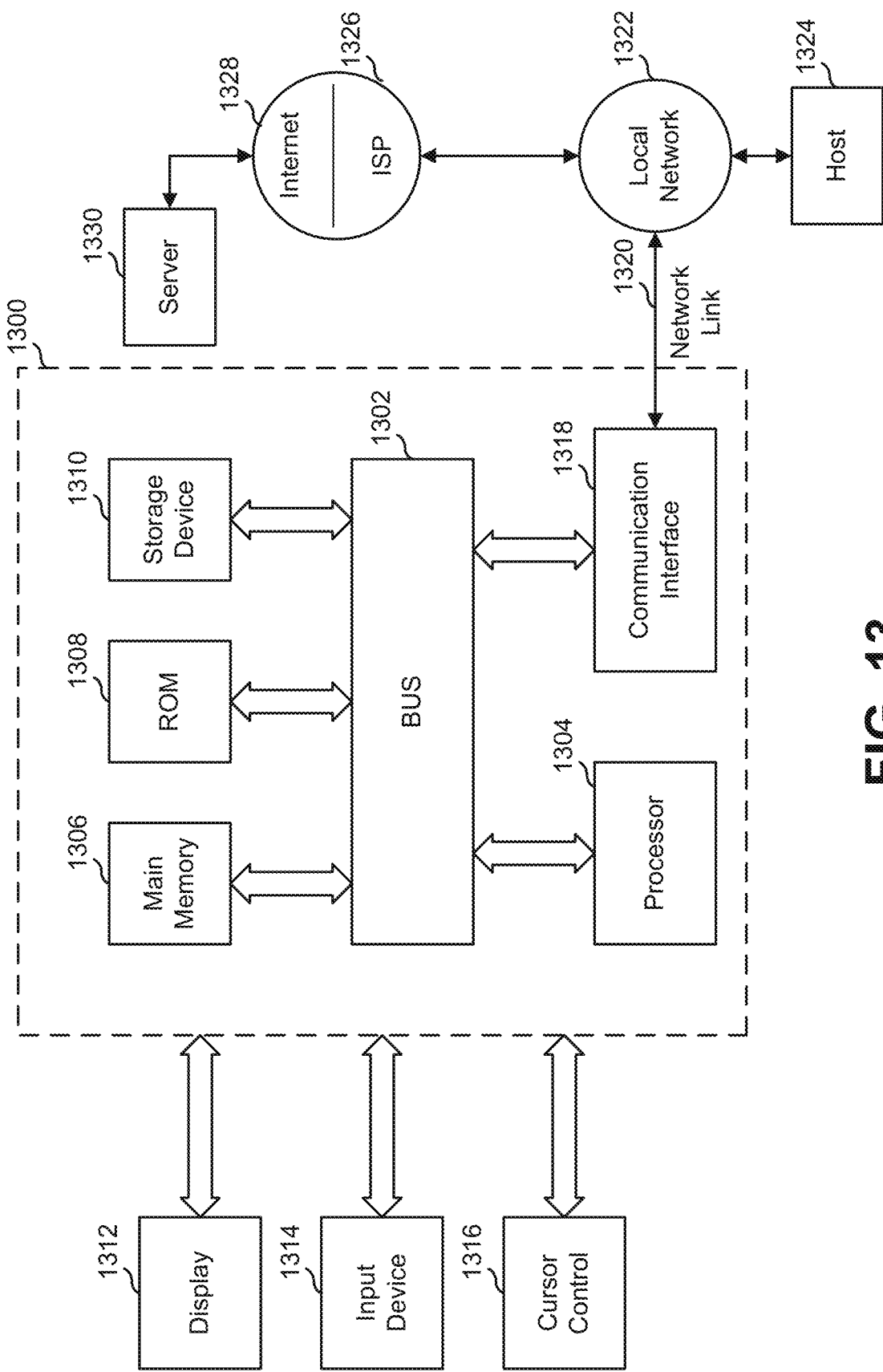
FIG. 13 is a block diagram that illustrates a computer system upon which the computer systems of the systems described herein and/or visual content generation system may be implemented, in accordance with at least one implementation of the present disclosure.

For example, FIG. 13 is a block diagram that illustrates a computer system 1300 upon which the computer systems of the systems described herein and/or visual content generation system 1200 (see FIG. 12) may be implemented, in accordance with at least one implementation of the present disclosure. Computer system 1300 includes a bus 1302 or other communication mechanism for communicating information, and a processor 1304 coupled with bus 1302 for processing information. Processor 1304 may be, for example, a general-purpose microprocessor.

Computer system 1300 also includes a main memory 1306, such as a random-access memory (RAM) or other dynamic storage device, coupled to bus 1302 for storing information and instructions to be executed by processor 1304. Main memory 1306 may also be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a computer monitor, for displaying information to a computer user. An input device 1314, including alphanumeric and other keys, is coupled to bus 1302 for communicating information and command selections to processor 1304. Another type of user input device is a cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one implementation, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative implementations, hardwired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a network connection. A modem or network interface local to computer system 1300 can receive the data. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be a network card, a modem, a cable modem, or a satellite modem to provide a data communication connection to a corresponding type of telephone line or communications line. Wireless links may also be implemented. In any such implementation, communication interface 1318 sends and receives electrical, electromagnetic, or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world-wide packet data communication network now commonly referred to as the "Internet" 1328. Local network 1322 and Internet 1328 both use electrical, electromagnetic, or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320, and communication interface 1318. In the Internet example, a server 1330 might transmit a requested code for an application program through the Internet 1328, ISP 1326, local network 1322, and communication interface 1318. The received code may be executed by processor 1304 as it is received, and/or stored in storage device 1310, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain implementations require at least one of A, at least one of B and at least one of C each to be present.

The use of examples, or exemplary language (e.g., "such as") provided herein, is intended merely to better illuminate implementations of the invention and does not pose a limitation on the scope of the invention unless otherwise claimed. No language in the specification should be construed as indicating any non-claimed element as essential to the practice of the invention.

In the foregoing specification, implementations of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further implementations can be envisioned to one of ordinary skill in the art after reading this disclosure. In other implementations, combinations or sub-combinations of the above-disclosed invention can be advantageously made. The example arrangements of components are shown for purposes of illustration and combinations, additions, re-arrangements, and the like are contemplated in alternative implementations of the present invention. Thus, while the invention has been described with respect to exemplary implementations, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of generating a virtual scene rendering usable in a captured scene, the method comprising:
   determining a camera position of a camera in a stage environment;
   determining a mapping of a plurality of subregions of a virtual scene display in the stage environment to corresponding positions in the stage environment;
   for a given virtual scene element of a virtual scene:
   a) determining a corresponding subregion of the plurality of subregions for the given virtual scene element,
      wherein the virtual scene display comprises a physical display device in the stage environment, and
      wherein the corresponding subregion corresponds to where on the physical display device the given virtual scene element would, at least in part, appear if the virtual scene were displayed on the virtual scene display;
   b) determining a stage subregion depth value for the corresponding subregion, wherein the stage subregion depth value represents a distance from the corresponding subregion to at least one of the camera position and a focal point of the camera based, at least in part, on the mapping of the plurality of subregions to the corresponding positions in the stage environment;
   c) determining a virtual subregion depth value based, at least in part, on a depth value for the given virtual scene element; and
   d) determining a blur factor for the corresponding subregion based at least in part on the stage subregion depth value and the virtual subregion depth value; and
   on the virtual scene display in the stage environment, rendering the virtual scene taking into account the blur factor for the given virtual scene element.

2. The computer-implemented method of claim 1, wherein the virtual scene display varies from a plane perpendicular to a camera optical axis.

3. The computer-implemented method of claim 1, wherein the corresponding subregion comprises an N×N pixel array on the physical display device.

4. The computer-implemented method of claim 1, wherein the corresponding subregion comprises a single pixel on the physical display device.

5. The computer-implemented method of claim 1, wherein each subregion of the plurality of subregions is of a same size or number of pixels as the other subregions in the plurality of subregions.

6. The computer-implemented method of claim 1, wherein at least one subregion of the plurality of subregions is of a different size or number of pixels than at least one other subregion of the plurality of subregions.

7. The computer-implemented method of claim 1, wherein the subregions of the plurality of subregions are contiguous.

8. The computer-implemented method of claim 1, wherein at least one subregion of the plurality of subregions is not contiguous with any other subregion of the plurality of subregions.

9. The computer-implemented method of claim 1, wherein determining each blur factor includes computing a transparency for pixels associated with object edges associated with a virtual scene element within a blurred subregion.

10. The computer-implemented method of claim 1, wherein each blur factor is applied as part of the rendering of the virtual scene.

11. The computer-implemented method of claim 1, wherein each blur factor is applied to pixels of the rendered virtual scene that are associated with a respective blurred subregion.

12. The computer-implemented method of claim 11, wherein the blur factor of the respective blurred subregion is updated when a change occurs to at least one of the camera position, the respective subregion of the respective virtual scene element, and/or a focus parameter of the camera.

13. A non-transitory computer-readable storage medium storing instructions, which when executed by at least one processor of a computer system, causes the computer system to carry out the method of claim 1.

14. A computer system comprising:
   one or more processors; and
   a storage medium storing instructions, which when executed by the one or more processors, cause the computer system to implement the method of claim 1.

15. A non-transitory computer-readable medium carrying image data that includes pixel information generated according to the method of claim 1.

* * * * *

UNITED STATES PATENT AND TRADEMARK OFFICE
CERTIFICATE OF CORRECTION

PATENT NO. : 11,488,348 B1
APPLICATION NO. : 17/547173
DATED : November 1, 2022
INVENTOR(S) : Kimball D. Thurston et al.

It is certified that error appears in the above-identified patent and that said Letters Patent is hereby corrected as shown below:

On the Title Page

Item (71) Correct Applicant Name to read as Unity Technologies SF

Signed and Sealed this
Tenth Day of January, 2023

Katherine Kelly Vidal
Director of the United States Patent and Trademark Office